US006888134B2

(12) United States Patent
Hashimoto et al.

(10) Patent No.: US 6,888,134 B2
(45) Date of Patent: May 3, 2005

(54) MASS SPECTROMETER AND MASS SPECTROMETRIC METHOD

(75) Inventors: Yuichiro Hashimoto, Kokubunji (JP); Hideki Hasegawa, Tachikawa (JP); Takashi Baba, Kawagoe (JP); Izumi Waki, Asaka (JP)

(73) Assignee: Hitachi High-Technologies Corporation, Tokyo (JP)

(*) Notice: Subject to any disclaimer, the term of this patent is extended or adjusted under 35 U.S.C. 154(b) by 134 days.

(21) Appl. No.: 10/608,263

(22) Filed: Jun. 30, 2003

(65) Prior Publication Data

US 2004/0119015 A1 Jun. 24, 2004

(30) Foreign Application Priority Data

Dec. 24, 2002 (JP) ........................................ 2002-372200

(51) Int. Cl.[7] .......................... H01J 49/42; H01J 49/00; B01D 59/44

(52) U.S. Cl. ....................... 250/292; 250/281; 250/282; 250/283; 250/286; 250/290; 250/293

(58) Field of Search ................................ 250/292, 290, 250/281–283, 286, 293

(56) References Cited

U.S. PATENT DOCUMENTS 4,650,999 A 3/1987 Fies
4,736,101 A 4/1988 Sykas
4,882,484 A * 11/1989 Franzen et al. ............. 250/282
5,171,991 A * 12/1992 Johnson et al. ............. 250/292
5,198,665 A * 3/1993 Wells ......................... 250/282
5,200,613 A * 4/1993 Kelley ........................ 250/282
5,206,507 A * 4/1993 Kelley ........................ 250/282
5,352,890 A * 10/1994 Johnson et al. ............. 250/282
5,399,857 A * 3/1995 Doroshenko et al. ....... 250/292
5,451,782 A * 9/1995 Kelley ........................ 250/282
5,457,315 A * 10/1995 Wells et al. ................ 250/282
5,789,747 A * 8/1998 Kato et al. .................. 250/292
6,469,298 B1 * 10/2002 Ramsey et al. ............. 250/292
6,570,151 B1 * 5/2003 Grosshans et al. .......... 250/282
6,627,875 B2 * 9/2003 Afeyan et al. .............. 250/282
2002/0195555 A1 12/2002 Weinberger et al. ........ 250/281
2003/0085349 A1 * 5/2003 Kato .......................... 250/292

OTHER PUBLICATIONS

"Effects of Heavy Gases on the Tandem Mass Spectra of Peptide Ions in the Quadrupole Ion Trap", Richard W. Vachet and Gray L. Glish, Journal of American Society for Mass Spectrometry, vol. 7, pp. 1194–1202, 1996.
"High efficiency MALDI–QIT–ToF mass spectrometer", Ling Ding et al., Proceeding SPIE the International Society for Optical Engineering, 199, vol. 3777, pp. 144–155.
"Use of Infrared Multiphoton Photodissociation with SWIFT for Electrospray Ionization and Laser Desorption Applications in a Quadrupole Ion Trap Mass Spectrometer", Armando Colorado et al., Analytical Chemistry, 1996, vol. 68, pp. 4033–4043.

* cited by examiner

*Primary Examiner*—John R. Lee
*Assistant Examiner*—Bernard E. Souw
(74) *Attorney, Agent, or Firm*—Antonelli, Terry, Stout & Kraus, LLP

(57) ABSTRACT

There is provided an ion trap mass spectrometer which can detect fragment ions having a low mass and enables high-sensitivity measurement. A mass spectrometer has an ion source generating sample ions; an ion trap having a pair of and endcap electrodes and a ring electrode and accumulating ions generated by the ion source and isolating precursor ions from the accumulated ion and dissociating the isolated precursor ions and ejecting the dissociated ions from the ion trap. A gas introduction hole is arranged in the endcap electrode or the ring electrode for introducing in intermittently-introduced bath gas therethrough into the ion trap. A detector detects the ions ejected from the ion trap. The center axis of the gas introduction hole is arranged so as to pass through a region near the center of gravity of the ion trap.

15 Claims, 17 Drawing Sheets

MASS SPECTROMETER AND MASS SPECTROMETRIC METHOD

FIELD OF THE INVENTION

The present invention relates to all mass spectrometers which can apply a quadruple ion trap, such as a quadruple ion trap mass spectrometer, a quadruple ion trap-time-of-flight mass spectrometer, and a quadruple ion trap-Fourier transformed ion cyclotron resonance mass spectrometer.

BACKGROUND OF THE INVENTION

As an example of various mass spectrometric methods, there is an ion trap mass spectrometric method. The basic principle of a quadruple ion trap mass spectrometric method is known (Patent Document 1). In the ion trap method, an RF voltage having a frequency of about 1 MHz is applied to a ring electrode to accumulate ions. In an ion trap, ions having above a certain mass become in a stable condition to be accumulated. The lower voltage applied to the ring electrode is swept to the higher one. In this case, the ions having a low mass are first ejected to obtain a mass spectrum.

In this method, however, different kinds of ions having the same mass cannot be discriminated. To improve this, tandem mass spectrometry in an ion trap has been developed. As an example of the tandem mass spectrometry in a quadruple ion trap, collisional activated dissociation with a bath gas in a quadruple ion trap is known (Patent Document 2). In this method, ions generated by an ion source are accumulated into an ion trap to isolate precursor ions having a mass to be detected. After ion isolation, a supplemental AC electric field resonant with the precursor ions is applied between endcap electrodes to expand an ion trajectory. The ions are collided with a bas gas filled in the ion trap to dissociate the ions for detection. Fragment ions exhibit a specific pattern by a difference in molecular structure. Different kinds of ions having the same mass can be discriminated.

To dissociate the ions, an ion trapping potential produced by the voltage applied to the ring electrode must be increased. To increase the trapping potential, the voltage applied to the ring electrode must be set to a high voltage. This moves the fragment ions having a low mass away from the stable trajectory condition so that the ions cannot be trapped. In matrix-assisted laser desorption ionization, monovalent ions having a high mass (molecular weight above 2000) are easily generated. These are stable in structure to be hard to dissociate in the general collisional activated dissociation.

There is known a method for solving the problems that fragment ions having a low mass cannot be detected and that ions having a high mass cannot be dissociated (Non-Patent Document 1). In this method, in addition to a continuously-introduced bath gas (Typically, He is used.) continuously introduced for cooling ions, a gas having a large molecular weight such as Ar is intermittently introduced from a gap between endcap electrodes and a ring electrode using a switchable solenoid valve to promote ion collisional activated dissociation in an ion trap. After these operations, an RF voltage applied to the ring electrode is increased to sequentially eject ions from the ion trap for detection. This can increase the ion excitation effect in the ion trap to detect fragment ions having a lower mass. A method for applying the same method as this method to an ion trap-hybrid time-of-flight mass spectrometer is known (Non-Patent Document 2). Also in this method, in addition to a general continuously-introduced bath gas (Typically, He is used.), a gas having a large molecular weight such as Ar is intermittently introduced from a gap between endcap electrodes and a ring electrode using a high-speed switchable solenoid valve to promote ion collisional activated dissociation in an ion trap. After these operations, a DC voltage is applied to the endcap electrode and the ring electrode to draw ions for coaxial acceleration, thereby performing mass dissociation from the time of flight of the ions. This can detect fragment ions having a lower mass at high mass accuracy.

There is known a method for solving the general collisional activated dissociation problems that fragment ions having a low mass cannot be detected and that ions having a high mass cannot be dissociated (Non-Patent Document 3). In this method, after ion isolation, a CO2 laser is irradiated from a hole through a ring electrode onto the center part of a trap. The ions absorb an infrared ray to advance dissociation by excitation of an internal energy. In this method, a quadruple ion trap mass spectrometer can detect fragment ions having a low mass.

[Patent Document 1]

U.S. Pat. No. 4,650,999

[Patent Document 2]

U.S. Pat. No. 4,736,101

[Non-Patent Document 1]

Richard W. Vachet and Gray L. Glish, Journal of American Society for Mass Spectrometry, Vol. 7, pp. 1194–1202, 1996)

[Non-Patent Document 2]

Li Ding et al., Proceeding SPIE the international Society for Optical Engineering, 1999, Vol. 3777, pp. 144–155

[Non-Patent Document 3]

Armando Colorado et al., Analytical Chemistry, 1996, Vol. 68, pp. 4033–4043

SUMMARY OF THE INVENTION

A step of accumulating ions into an ion trap, a step of selectively holding precursor ions in the ion trap, a step of dissociating the precursor ions with the aid of an intermittently-introduced bath gas or an irradiation laser, and a step of detecting fragment ions are conducted with time and repeated to conduct mass spectrometry at high sensitivity. Problems remain in the respective methods.

In the examples described in the Non-Patent Documents 1 and 2, to promote ion collisional activated dissociation in the ion trap, the operation of introducing the intermittently-introduced bath gas one or more times for a short time below 1 ms is repeated between several tens to hundreds of ms in the collisional activated dissociation process. The pressure in the ion trap is fluctuated in the process of dissociating the precursor ions by the collisional activated dissociation. It is difficult to set a supplemental voltage condition at the collisional activated dissociation dependent largely on the gas pressure to an optimum.

As a mounting problem, in the example described in Non-Patent Document 1, to obtain the mass accuracy, several hundreds of ms until the introduced intermittently-introduced bath gas is discharged from the ion trap is a waiting time before detection. This significantly reduces the ion utilization efficiency (duty cycle) of the entire apparatus to largely lower the sensitivity. In the example described in Non-Patent Document 2, to reduce the waiting time, a turbo molecular pump only for evacuating the gas in the ion trap is provided to increase the evacuation ability. This, however, significantly increases the cost of the apparatus.

In the method described in Non-Patent Document 3, the quadruple ion trap mass spectrometer can detect fragment ions having a low mass. The bath gas pressure (below 0.01 Pa) in the ion trap necessary for using a $CO_2$ laser having an output of about 50 W does not correspond with the degree of vacuum (about 0.1 to 1 Pa) optimum for maintaining the ion trap efficiency and sensitivity. In the priori art dissociation method using a laser beam, ion accumulation and dissociation in the ion trap cannot be conducted at an optimum degree of vacuum. The prior art ion trap mass spectrometer using a laser lowers the ion trap efficiency and sensitivity to obtain high dissociation efficiency.

An object of the present-invention is to provide a mass spectrometer and a mass spectrometric method using an ion trap which can detect fragment ions having a low mass and enables measurement at high sensitivity.

A mass spectrometer of the present invention has an ion source generating sample ions; an ion trap having a pair of endcap electrodes and a ring electrode and accumulating, dissociating and ejecting the ions; gas introduction means arranged in the endcap electrode or the ring electrode for introducing an intermittently-introduced bath gas into the ion trap at a predetermined timing; and a detector detecting the ions ejected from the ion trap, wherein the center axis of a gas introduction hole is arranged so as to pass through a region of the center of gravity of the ion trap.

In the mass spectrometer of the present invention, the gas pressure in the ion trap can be switched at high speed, and the respective switched pressures can be held almost constant. Specifically, a bath gas (such as Ar or N2) having a heavy mass is intermittently introduced in a collisional activated dissociation process of precursor ions having a mass to be detected to conduct CID (collision-induced dissociation). In a mass spectrometer of a type dissociating ions by laser irradiation, a bath gas is introduced only in an ion accumulation process and an ion isolation process and gas introduction is stopped in a precursor ion dissociation process to conduct photo dissociation. In the present invention, the sensitivity of the mass spectrometer is increased as compared with the prior art.

DESCRIPTION OF THE PREFERRED EMBODIMENT (Embodiment 1)

An embodiment of a quadruple ion trap of the present invention will be described with reference to FIG. 1.

Figure 1:
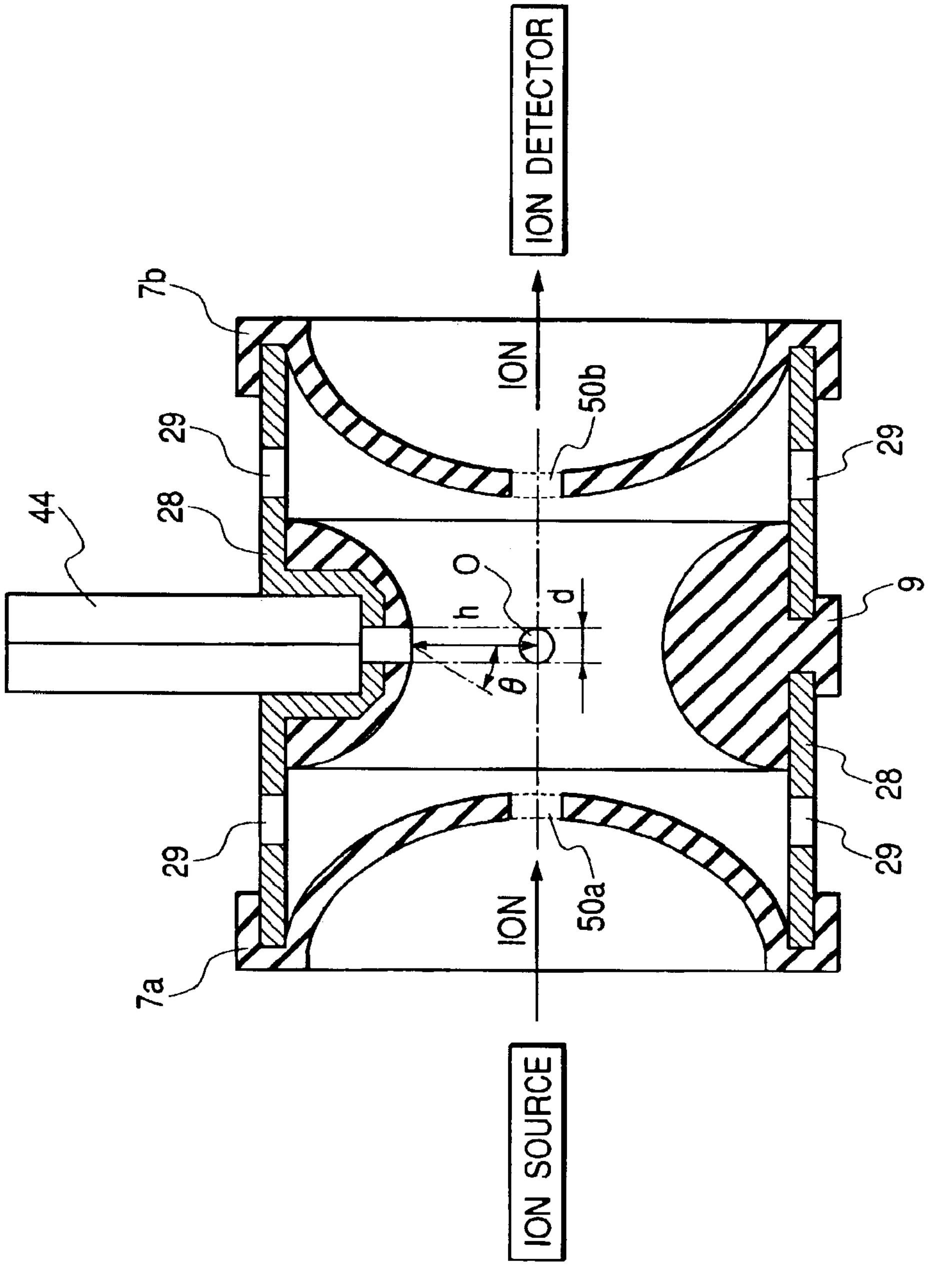
FIG. 1 is a cross-sectional view of an embodiment of a quadruple ion trap of the present invention.

FIG. 1 is across-sectional view of the embodiment of the quadruple ion trap of the present invention. The quadruple ion trap constructs a cylindrical ion trap region whose both-side end surfaces are recessed in a bowl shape by a pair of opposed endcap electrodes 7*a*, 7*b* in a bowl shape, a donut-like ring electrode 9, and cylindrical insulators 28 for coupling the ring electrode 9 and the endcap electrodes 7*a*, 7*b* and electrically insulating the ring electrode 9 and the endcap electrodes 7*a*, 7*b*. The endcap electrode 7*a* is formed with a hole (ion incidence hole) 50*a* into which ions are incident. The endcap electrode 7*b* is formed with a hole (ion ejection hole) 50*b* from which ions are ejected. A suitable number of small apertures 29 are distributively provided on the insulators 28. The ring electrode 9 is provided with a hole having inner diameter d. A pulsed valve 44 using a solenoid capable of switching at high speed below 1 ms is provided in the hole to be communicated therewith. As described later, the pulsed valve 44 is opened and closed to introduce an intermittently-introduced bath gas (such as Ar or N2) having a heavy mass in a collisional activated dissociation process of precursor ions having a mass to be detected for conducting CID (collision-induced dissociation).

To the quadruple ion trap are introduced ions from an ion source ionizing samples to be analyzed through the hole 50*a* on the endcap electrode 7*a*. The ions subjected to collisional activated dissociation in the quadruple ion trap are ejected from the hole 50*b* on the endcap electrode 7*b* and are then detected by a detector. In the mass spectrometer using the quadruple ion trap, a step of accumulating ions into the ion trap region, a step of selectively trapping precursor ions in the ion trap region, a step of dissociating the precursor ions with the aid of the intermittently-introduced bath gas or an irradiation laser, and a step of detecting fragment ions are conducted with time and repeated to conduct mass spectrometry at high sensitivity. Its construction and operation will be described later.

Numerical value examples of the representative construction of the quadruple ion trap of Embodiment 1 are as follows. Needless to say, the present invention is not limited to these size and shape. The distance in the position in which the endcap electrodes 7*a*, 7*b* are closest to each other is about 10 mm. The radius of the inside of the ring electrode 9 is about 7 mm. The ion trap region by a three-dimensional quadruple field is formed in the space interposed between these electrodes. This accumulates ions to selectively eject the ions from the hole 50*b* on the endcap electrode 7*b*. The inner diameter d of the hole provided in the ring electrode 9 is desirably about 0.2 to 2 mm.

Generally, a bath gas for cooling ions is continuously introduced into the quadruple ion trap, although the indication is omitted in FIG. 1. This will be additionally described in the description of the, mass spectrometer using the quadruple ion trap.

The ions introduced into the quadruple ion trap and cooled by collision with the continuously-introduced bath gas are focused onto region O of a relatively small sphere (having a small diameter of 1–2 mm) centered at the center of gravity of the quadruple ion trap having the lowest potential. In other words, the ions gather into the region indicated by O at high density. When the inner diameter d of the hole provided in the ring electrode 9 is 2 mm, it is of almost the same degree as the region indicated by O. The present invention has noted this point. The molecular, flow of the intermittently-introduced bath gas for conducting CID (collision-induced dissociation) introduced from the hole provided in the ring electrode 9 via the pulsed valve 44 collides directly with the region indicated by O so that the intermittently-introduced bath gas and the ions interact efficiently. That is, in the ion dissociation process, the molecular flow of the intermittently-introduced bath gas collides directly with the ion region focused at high density for efficient dissociation.

In the mass spectrometer, the ion dissociation process is continued to the ion detection process. In order that switching of the processes can be conducted immediately, it is important that the intermittently-introduced bath gas can be discharged quickly. In the present invention, the gas can be evacuated quickly from the holes 50*a*, 50*b* on the endcap electrodes and the small apertures 29 provided in the insulators 28. The construction of the quadruple ion trap is simple and conductance related to gas movement can be larger. Evacuation can be done in a short time below 1 ms. The ion dissociation process can be switched immediately to the ion detection process.

Figure 2:
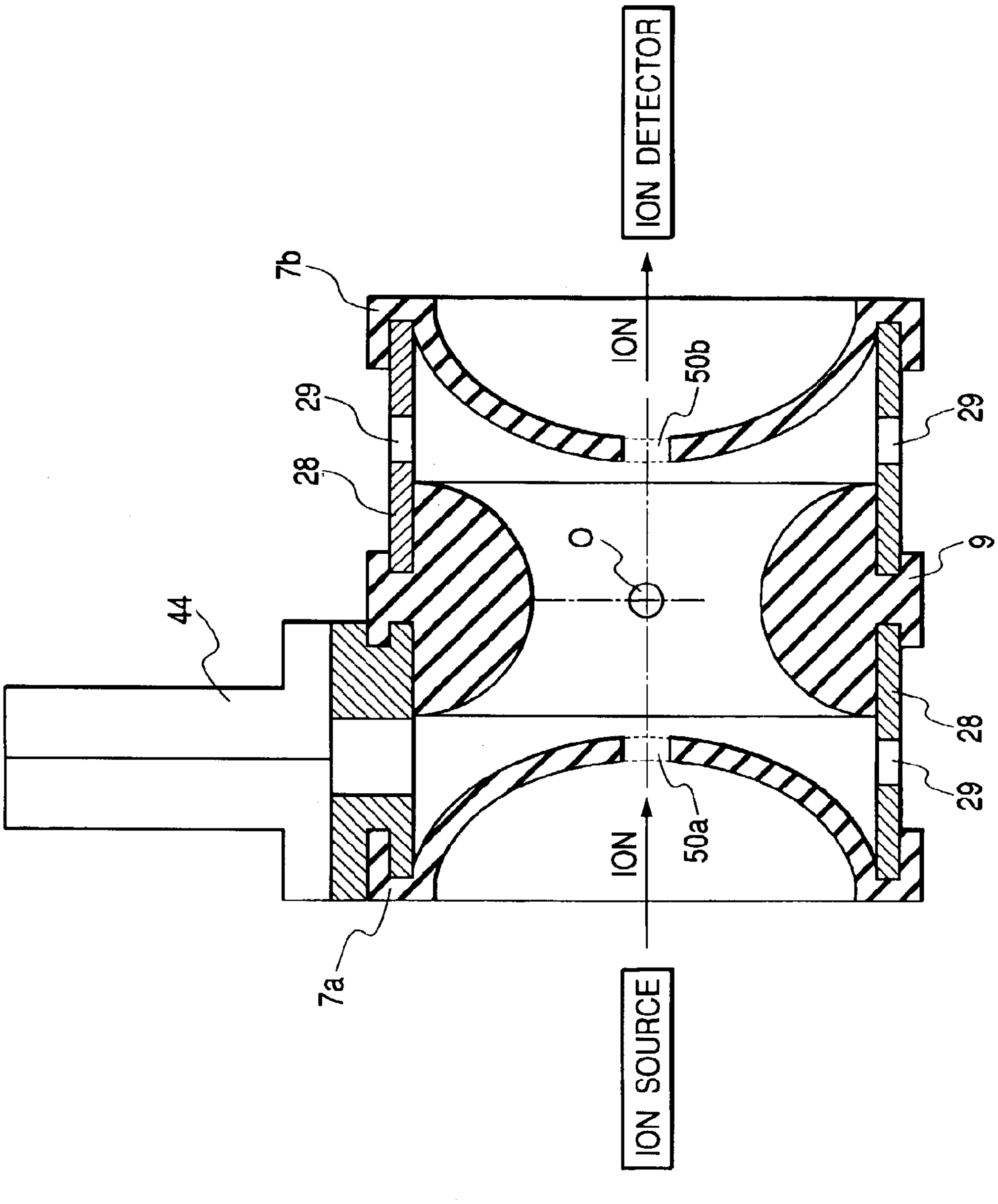
FIG. 2 is a cross-sectional view showing the construction of a prior art quadruple ion trap corresponding to Embodiment 1 shown in FIG. 1.

FIG. 2 is a cross-sectional view showing the construction of a prior art quadruple ion trap corresponding to Embodiment 1 shown in FIG. 1. In this example, the pulsed valve 44 controlling introduction of the intermittently-introduced bath gas is provided in the position to avoid the ring electrode 9. Other constructions are the same as those of FIG. 1.

As is apparent from comparison of FIG. 2 with FIG. 1, according to the present invention, the molecular flow of the intermittently-introduced bath gas introduced via the pulsed valve 44 collides directly with the region O into which the ions gather at high density. In the prior art shown in FIG. 2, the intermittently-introduced bath gas introduced into the ion trap acts, by diffusion, on the region O into which the ions gather at high density. The CID (collision-induced dissociation) by the intermittently-introduced bath gas is indirect. The high-efficiency dissociation according to the present invention cannot be expected.

For switching from the ion dissociation process to the ion detection process, it is important that the intermittently-introduced bath gas can be discharged quickly. In the construction of FIG. 2, the construction of the quadruple ion trap is not simple unlike the present invention. Conductance related to gas movement cannot be larger so that the evacuation time is longer.

Figure 3:
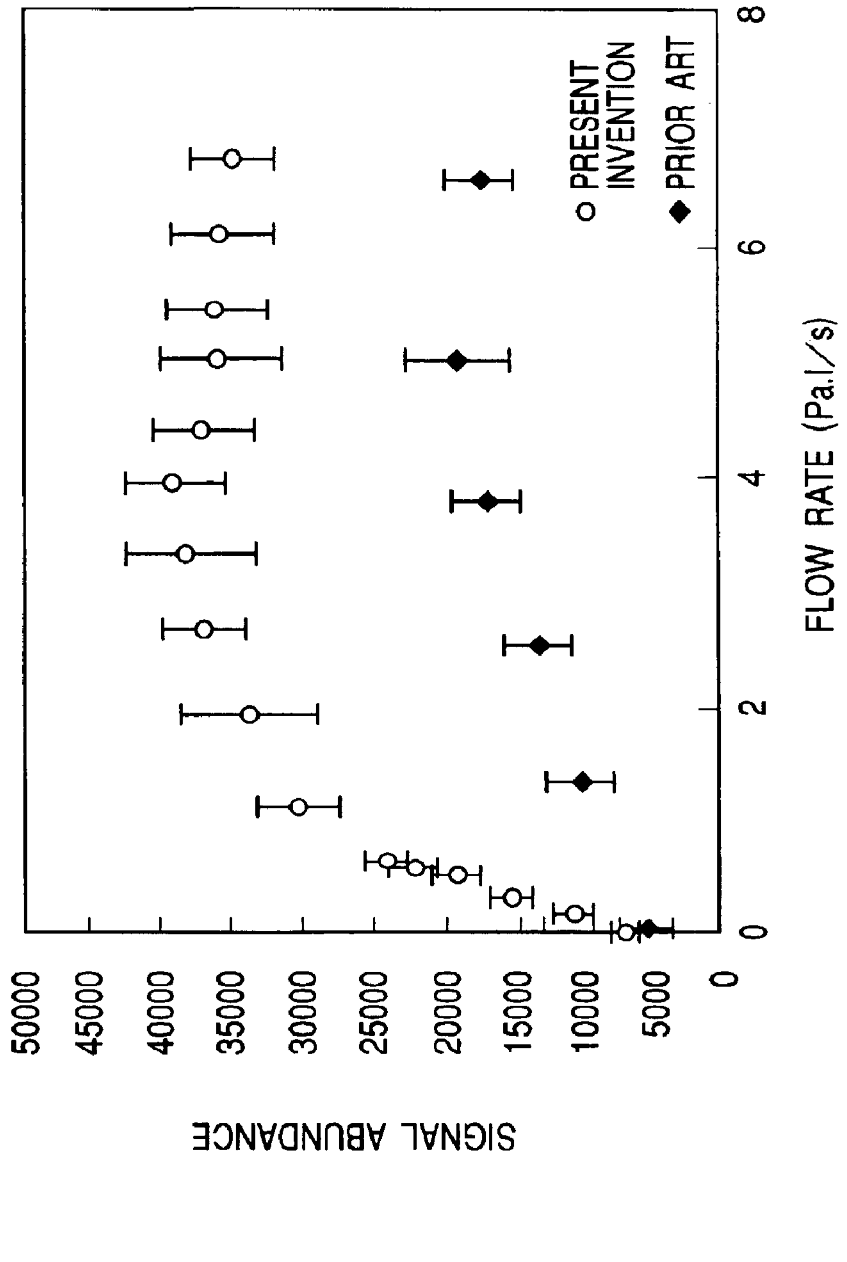
FIG. 3 is a diagram showing results obtained by conducting mass spectrometry of known samples in the case that the existing ion trap of a mass spectrometer is of the construction of Embodiment 1 of the present invention shown in FIG. 1 and in the case that it is of the prior art construction shown in FIG. 2 to evaluate intermittently-introduced bath gas flow rate dependence of ion trapping efficiency.

FIG. 3 is a diagram showing results obtained by conducting mass spectrometry of known samples in the case that the existing ion trap of a mass spectrometer is of the construction of Embodiment 1 of the present invention shown in FIG. 1 and in the case that it is of the prior art construction shown in FIG. 2 to evaluate intermittently-introduced bath gas flow rate dependence of ion trapping efficiency. In both cases, controls of the flow rate by control of the pulsed valve 44 are the same.

As is easily understood from FIG. 3, in both cases, signal abundance is first increased and is then saturated as the flow rate rises. In Embodiment 1, high trapping efficiency can be obtained at a small flow rate and saturation occurs at a small flow rate. It can be considered that since the gas density of the introduced gas near the center of gravity of the ion trap is locally increased, collision-induced dissociation by the gas effectively occurs to effectively act on trapping. In the prior art construction, the signal abundance is slowly increased and the degree of the increase is small. From the results of FIG. 3, according to the present invention, as compared with the prior art, it can be considered that the pressure of the center of gravity of the ion trap can be increased by about 5 to 10 times at the same flow rate. This phenomenon will be described below.

When a primary pressure (gas pressure when the pulsed valve 44 is opened to introduce the gas into the ion trap) is $P_1$, flow rate Q generally introduced is calculated by Formula (1)

$$Q=Cd^2P_1 \quad (1)$$

where C is a constant decided by pressure and is calculated as 91 m/s in a molecular flow region (below 0.1 Pa). The inner diameter d of the hole of the pulsed valve 44 and the primary pressure $P_1$ are adjusted to decide the flow rate Q. When the pressure in the ion trap is assumed to be uniform and evacuation conductance of the ion trap is S., pressure PIT and gas density $D_{IT}$ in the trap are given by Formulas (2), (3). R is a gas constant and k is a Boltzmann constant.

$$P_{IT} = \frac{Q}{S} = \frac{Cd^2 P_1}{S} \quad (2)$$

$$D_{IT} = \frac{P_{IT}}{kT} = \frac{Cd^2 P_1}{SkT} \quad (3)$$

The evacuation speed S is decided by, the shape of the ion trap and the evacuation speed of an evacuation pump of a vacuum chamber surrounding the ion trap. From these, the $P_{IT}$ and $D_{IT}$ can be adjusted. When the evacuation speed S from the ion trap to the outside is about 0.015 $m^3/s$ (when 20 small apertures 29 provided in the insulators 28 having a diameter of 3 mm are arranged distributively), in order that the $P_{IT}$ is 1 Pa (with T=300K, $D_{IT}=2.4\times10^{18}$ pieces/$m^3$), the flow rate Q=7 PaL/s. The relation between the $D_{IT}$ and $P_1$ can be obtained from this. When d 2 mm and 20 small apertures 29 are arranged distributively, $P_1$=56 Pa.

When the gas is flowed from the high pressure part to the low pressure part, a molecular beam is formed. The center direction of the molecular beam is formed almost vertically to the hole surface of a gas discharge orifice. Within the range of a Mach disk, from the primary-side pressure $P_1$ of the pulsed valve 44, gas density D (h, θ) in the range of downstream h from the hole surface in which the gas is introduced from the pulsed valve 44 into the ion trap and angle θ from the center axis of the gas flow path of the pulsed valve 44 of the jet gas discharged from the pulsed valve 44 is expressed by Formula (4). X(γ) and ϕ are constants, from experience, obtained by the degree of freedom of the gas. In the case of a rare gas, X(γ)=0.562 and ϕ=1.37 (rad).

$$D(h,\theta) = \frac{P_1}{kT}\left(\frac{d}{h}\right)^2 X(\gamma)\cos^2\left(\frac{\pi\theta}{2\phi}\right)$$

As an example, when $P_1$=56 Pa, h=7 mm and ϕ=0, D(h, 0)=$4.7\times10^{18}$ pieces/$m^3$ The calculated result means that the gas density is about twice that of the model in which the pressure is considered to be uniform in the ion trap. The center part of the ion trap (h, θ=0) is found to have high pressure. In the case that θ=20°, D(h, 20°)=$4.0\times10^{18}$ pieces/$m^3$. The gas density is calculated to be about 1.7 times higher than that. The pressure is high in the position (h, θ=20°) near the center part of the ion trap.

The region having high gas pressure can be formed in the ion trap. This is because the center of gravity of the ion trap is occupied by the molecular beam from the jetting hole of the pulsed valve 44. The region having high gas pressure selectively exits in the region of D (h, θ)>$D_{IT}$. Formula (5) is obtained from the Formulas (3), (4).

$$h \le \sqrt{\frac{SX(\gamma)}{C}}\cos\left(\frac{\pi\theta}{2\phi}\right) \quad (5)$$

Specifically, when S=0.04 $m^3/s$ and θ =0, the pressure is higher in the region of h≦16 mm.

In Formula (5), it is possible to define the position relation between the gas introduction position which can selectively increase the gas density in the region near the center of gravity of the ion trap and the center of gravity of the ion trap. The distance from the front edge of the gas introduction hole provided in the ring electrode 9 to the center of gravity of the ion trap may be below 16 mm. In the construction example of Embodiment 1, the radius of the inside of the ring electrode 9 is about 7 mm to satisfy the condition.

The hole surface of the gas introduction hole (having a diameter of 0.2 to 2 mm) provided near the center of the ring electrode 9 cannot be always completely vertical to the center of gravity of the ion trap and may be tilted slightly. In this case, the center of the hole surface is a top, and a straight line passing through the top and the region O near the center of gravity of the ion trap on an axis connecting the centers of the holes 50*a*, 50*b* on the endcap electrodes 7*a*, 7*b* is a center axis. In a cone having a top angle below 40°, the center axis of the gas flow path jetted from the pulsed valve 44 is arranged. Substantially, it is possible to expect CID (collision-induced dissociation) of the same degree of that when the center axis of the gas flow of the pulsed valve 44 passes through the region having a diameter of 1 to 2 mm centered at the region O near the center of gravity of the ion trap.

Evacuation time Δt until the gas density is changed from $D_A$ to $D_B$ is expressed by Formula (6). V is an evacuation volume and S is an evacuation speed.

$$\Delta t = \frac{V}{S} ln\frac{D_A}{D_B} \quad (6)$$

The evacuation time is in proportion to the gas volume to be evacuated. The construction of Embodiment 1 can efficiently increase the gas pressure only in the center of gravity of the ion trap. The flow rate of the intermittently-introduced bath gas can be reduced. It is possible to expect to significantly increase the evacuation speed.

To check significant increase in the evacuation speed of the construction of the present invention, there is prototyped and evaluated an ion trap in which the hole diameter of the holes 50*a*, 50*b* on the endcap electrodes 7*a*, 7*b* is 3 mmϕ and four gas relief apertures 29 (3 mmϕ) are provided in the insulator spacers 28. In this construction, the internal volume of the ion trap interposed between the endcap electrodes 7*a*, 7*b*, the ring electrode 9 and the insulator spacers 28 is 9 cc.

Time constants (time at which the gas pressure is 1/e) of gas discharge from the inside of the ion trap in the construction of Embodiment 1 and the prior art construction shown in FIG. 2 are obtained from experiment. In the calculation method, dissociation efficiency corresponding to the gas density of the intermittently-introduced bath gas is obtained to change delay time for gas introduction and ion accumulation. The time constants obtained from this experiment are below 1 ms in the method of Embodiment 1 and 7±2 ms in the prior art construction shown in FIG. 2. The time constant of gas discharge by calculation of the method of Embodiment 1 is 1.6 ms.

From this result, it is found that the time constant of the method of Embodiment 1 is above 7 times that of the prior art construction shown in FIG. 2 and is above 1.6 times higher than the calculated value. In the present invention, gas introduction from near the center of the ring electrode 9 crossing the straight line almost vertical to the axis connecting the centers of the holes 50*a*, 50*b* on the endcap electrodes 7*a*, 7*b* passing through the region O near the center of gravity of the ion trap increases the gas pressure only in the center part onto which ions concentrate. Sufficient ion dissociation can be done even when the flow rate of the intermittently-introduced bath gas is small. The substantial evacuation volume V can be smaller and the construction is simple. Conductance is thus large.

An embodiment of the mass spectrometer which applies the ion trap of the present invention will be described below.

(Embodiment 2)

Figure 4:
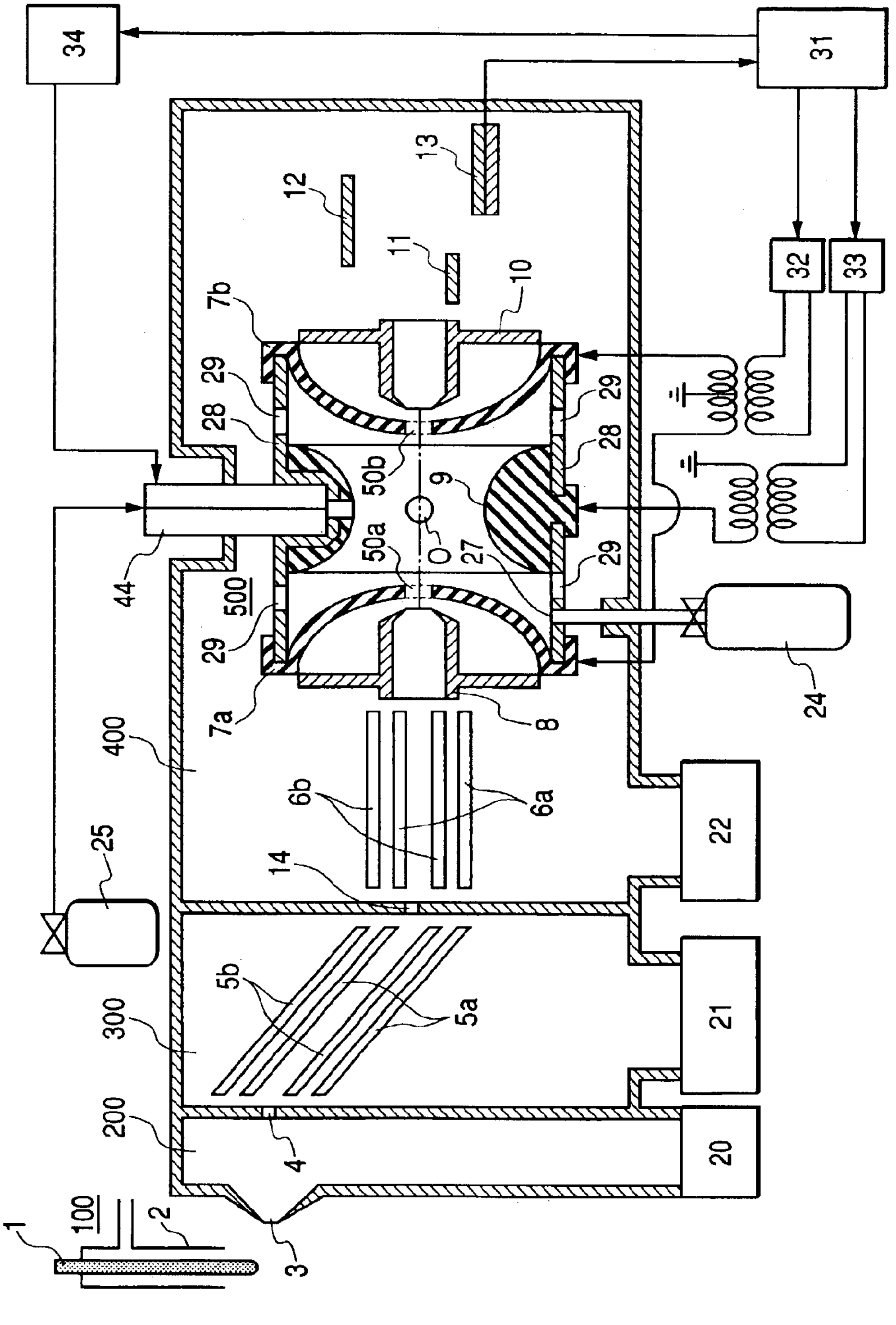
FIG. 4 is a second embodiment of the present invention and is a cross-sectional view of main construction parts of a construction example of an atmospheric pressure ionization ion trap mass spectrometer using the ion trap of Embodiment 1 using an electrospray ion source as an ion source.

FIG. 4 is a second embodiment of the present invention and is a cross-sectional view of main construction parts of a construction example of an atmospheric pressure ionization ion trap mass spectrometer using the ion trap of Embodiment 1 using an electrospray ion source. Embodiment 2 shown in FIG. 4 can be applied to all kinds of atmospheric pressure ion sources in the same manner.

The atmospheric pressure ionization ion trap mass spectrometer of Embodiment 2 has an atmospheric pressure ion source 100, a first differentially pumping region 200 at a vacuum level introducing sample ions generated by the ion source 100 via an orifice 3, a second differentially pumping region 300 at a vacuum level communicated via an orifice 4 with the first differentially pumping region 200 guiding ions by octapoles 5*a*, 5*b*, and a third differentially pumping region 400 at a vacuum level communicated via an orifice 14 with the second differentially pumping region 300 guiding ions by octapoles 6*a*, 6*b*. A quadruple ion trap 500 of Embodiment 1 is arranged in the third differentially pumping region 400. The differentially pumping regions 200, 300 and 400 have vacuum pumps 20, 21 and 22 to maintain the differentially pumping regions at a predetermined degree of vacuum.

As the ion source 100, FIG. 4 shows an example in which in the state that a high voltage of several kV is applied to an electrospray probe 1, samples are jetted from its front edge to ionize the samples under the atmospheric pressure. In the typical diameters of the electrospray probe 1, the outer diameter is about 0.3 mm and the inner diameter is about 0.15 mm. When a sample flow rate is above 20 L/min, a gas tube 2 is provided around the electrospray probe 1 to flow a nitrogen gas between the gas tube 2 and the electrospray probe 1 to stably advance ionizing.

Ions generated by the ion source 100 passes through the orifice 3 to be introduced into the first differentially pumping region 200 evacuated by the vacuum pump 20. The typical diameter of the orifice 3 is about 0.2 min. As the vacuum pump 20, a rotary pump of about 500 L/min is used. In this case, the pressure of the first differentially pumping region 200 is about 300 Pa.

The ions pass through the orifice 4 to be introduced into the second differentially pumping region 300 evacuated by the vacuum pump 21. The hole diameter of the orifice 4 is 1 to 2 mm. The pressure of the second differentially pumping region 300 is 0.7 to 1.3 Pa. The evacuation amount of the turbo molecular pump 21 is 150 L/s. The pressure of the second differentially pumping region 300 is about 0.7 to 1.3 Pa.

The octapoles 5*a*, 5*b* (Only four octapoles at the rearward side in the sheet are shown.) made of eight round poles are arranged in the second differentially pumping region 300. The ions pass through the center of the octapoles 5. An AC voltage of reverse phase of about 1 MHz and 150V (0-peak) is applied alternately to the electrode of the octapoles 5 (The display of a voltage supply and wiring is omitted.). The octapoles 5 have an effect of focusing the kinetic energy and position of the ions to carry the ions efficiently. They can be used for deflecting the ion trajectory.

The ions transmitted through the octapoles 5 pass through the orifice 14 to be introduced into the third differentially pumping region 400. The third differentially pumping region 400 is evacuated by the turbo molecular pump 22. The evacuation amount of the turbo molecular pump 22 is about 100 to 200 L/s. The pressure of the third differentially pumping region 400 is about 0.03 to 0.01 Pa. The ions passed through the orifice 14 are guided by the octapoles 6*a*, 6*b* (Only four octapoles at the rearward side in the sheet are shown.) to pass through an inlet gate electrode 8 and the hole 50*a* on the endcap electrode 7*a* to be introduced into the quadruple ion trap 500. A voltage is applied to the octapoles 6*a*, 6*b* as in the octapoles 7*a*, 7*b*.

The quadruple ion trap 500 has the same construction as that of FIG. 1. When it is incorporated into the mass spectrometer, a cooling gas for cooling the ions introduced into the trap (generally, He gas only) is continuously introduced from an aperture 27 from a cooling gas cylinder 24. The reason why only He is used as the continuously-introduced gas is that the mass resolution at isolation and detection is significantly lowered when using a gas having a heavy molecular weight.

As described above, the quadruple ion trap 500 has the pair of opposed endcap electrodes 7*a*, 7*b* in a bow shape and the donut-like electrode 9. The pulsed valve 44 is insulated from the ring electrode 9 by the insulators 28. The ring electrode 9 and the endcap electrodes 7*a*, 7*b* are insulated by the insulators 28 of Teflon (trademark). The distance between the endcap electrodes is about 10 mm. The radius of the circle inscribed in the ring electrode 9 is about 7 mm. To the ring electrode 9 is applied an RF voltage of 500 kHz to 1 MHz supplied from a power supply for the trapping RF voltage 33. To the ring electrode 9 is applied a high voltage (to ground) of several kV at the maximum. An AC voltage of 1 to 500 kHz produced by a power supply for the supplemental AC voltage 32 and a voltage superimposed thereon are applied-between the electrodes 7*a*, 7*b*. A three-dimensional quadruple field is formed in the space interposed between the ring electrode 9 and the endcap electrodes 7*a*, 7*b*. Ions are accumulated by the three-dimensional quadruple field to control the frequency and voltage between the electrodes 7*a*, 7*b* for ion isolation and collisional activated dissociation. The ions are selectively ejected from the hole 50*b* on the endcap electrode 7*b*.

The ring electrode 9 is provided with the hole of the pulsed valve 44. The pulsed valve 44 is coupled to a cylinder 25 of an intermittently-introduced bath gas source. When the flow rate of the intermittently-introduced bath gas introduced via the pulsed valve 44 is reduced, it may be reduced by a pump, not shown, provided at the upstream side of the pulsed valve 44. As the intermittently-introduced bath gas, He, Ar, N2, Xe, Kr and air can be used. An on-off valve is used for the gas cylinders 24, 25.

To the inlet gate electrode 8 is applied a voltage (to ground) of about 0 to −200V in the ion accumulation process in which ions generated by the ion source 100 are introduced into the quadruple ion trap 500 via the orifice 3, the orifice 4, the orifice 14, the inlet gate electrode 8 and the hole 50*a* on the endcap electrode 7*a*. To an outlet gate electrode 10 is applied a voltage (to ground) of about 0 to −300V in the detection process of the ions ejected from the hole 50*b* on the endcap electrode 7*b*. A deflector 11, a conversion dynode 12 and a detector 13 are provided at the downstream side of the outlet gate electrode 10. The ions passed through the outlet gate electrode 10 collide with the conversion dynode 12 by curving the ion trajectory by the deflector 11. To the conversion dynode 12 is applied a voltage of several kV at positive ion detection. When the ions collide with the conversion dynode 12, electrons are produced. The produced electrons reach the detector 13 having an electron multiplier to which a voltage of about 10 kV is applied and are then observed as signals.

The numeral 31 denotes a controller which controls voltage magnitudes, frequencies and applying timings of the power supply for the trapping RF voltage 33 applied to the ring electrode 9, the power supply for the supplemental AC voltage 32 applied between the endcap electrodes 7a, 7b, and a controller for pulsed valve 34. It also processes signals obtained from the detector 13 to obtain mass spectrum data of the samples. The signal processing part of the controller 31 is constructed by a so-called personal computer to permit necessary sequential processing and data statistical processing.

Figure 5:
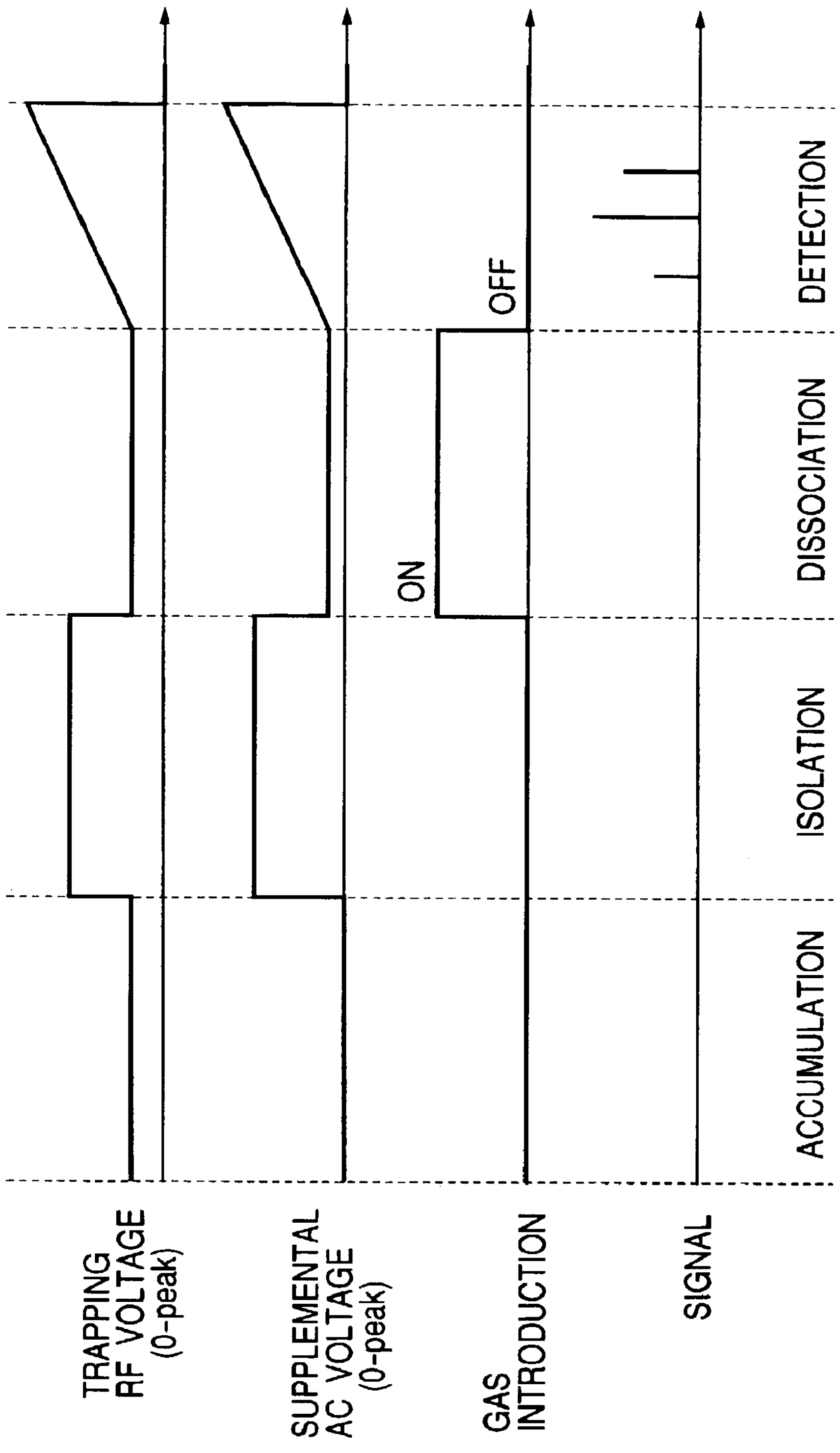
FIG. 5 is a diagram showing measurement sequences of Embodiment 2 of the present invention.

FIG. 5 is a diagram showing measurement sequences of Embodiment 2. The measurement sequences shown in FIG. 5 are controlled by the controller 31. An ion trap operation method in Embodiment 2 will be described below using FIG. 5.

In the operation of mass spectrometry in the ion trap of Embodiment 2, there are four sequences of the ion accumulation process, the precursor ion isolation process, the ion dissociation process and the ion detection process. To obtain data integration effect, the processes are repeated the number of times necessary for sequence.

In the ion accumulation process, a trapping RF voltage generated by the power supply for the trapping RF voltage 33 is applied to the ring electrode 9. During this, ions generated by the ion source 100 and passed through the orifice 3, the orifice 4, the orifice 14, the inlet gate electrode 8, and the hole 50a on the endcap electrode 7a are accumulated into the ion trap 500. A typical value of ion accumulation time is about 0.1 to 100 ms. When the accumulation time is too long, a phenomenon called space charge of the ions in the ion trap 500 disturbs an electric field. Suitable time is selected according to the kind of the samples. In the ion accumulation process, the intermittently-introduced bath gas for ion dissociation is not introduced from the pulsed valve 44.

In the precursor ion isolation process, the trapping RF voltage and the supplemental AC voltage are set to isolate precursor ions to be detected. For example, the trapping RF voltage is applied to the ring electrode 9, and an electric field superimposed on an RF component except for the resonant frequency of the precursor ions is applied between the endcap electrodes 7a, 7b. Ions other than the precursor ions are removed from the trap condition and are ejected to the outside of the ion trap 500. Only the ions in the ion mass range to be detected can remain in the ion trap 500.

There are other various methods for isolating ions to be detected, and any of these may be used. All the cases are the same in the aim that only the ions to be detected in a certain ion mass range remain in the ion trap. Typical time necessary for ion isolation is about 5 to 20 ms. In the precursor ion isolation process, the intermittently-introduced bath gas for ion dissociation is not introduced from the pulsed valve 44.

Next, in the ion dissociation process, the isolated precursor ions are dissociated. The trapping RF voltage is applied to the ring electrode 9. The supplemental AC voltage is applied between the endcap electrodes 7a, 7b. In the section of the ion dissociation process, the pulsed valve 44 is opened to introduce the intermittently-introduced bath gas. As the introduced gas, ions having a large molecular weight such as Ar, Xe or Kr are isolated to increase the ion dissociation efficiency.

Finally, ion detection is conducted in the ion detection process. At the ion detection, the trapping. RF voltage and the supplemental AC voltage are changed from the low voltage to the high voltage. The ions having a low mass are first unstabilized to be ejected to the outside of the ion trap. Ion intensity is detected by the detector 13. Also at the ion detection, the intermittently-introduced bath gas is not introduced from the pulsed valve 44. Since only He gas exists in the ion trap, the resolution is maintained. The trapping RF voltage and the mass of the ejected ions have a fixed relation. The detected ion intensity by the detector 13 is written as mass spectrum data to the controller 31.

A specific voltage setting method of Embodiment 2 will be described below. Pseudo potential Dz and index qz deciding ion stability are given by Formulas (7), (8). e is an electronic quantum. m is an ion mass. V is a voltage applied to the ring electrode 9. Ω is an angular frequency of the voltage V applied to the ring electrode 9. z0 is a half value of a distance between the endcap electrodes 7a, 7b (distance of the part in which the endcap electrodes 7a, 7b are closest to each other). When $r_0^2=2z_0^2$., $$D_Z = \frac{eV^2}{4mz_0^2\Omega^2} = \frac{q_zV}{8} = \frac{mz_0^2\Omega^2}{16e}q_z^2 \tag{7}$$

$$q_z = \frac{2eV}{mz_0^2\Omega^2} \tag{8}$$

Figure 6:
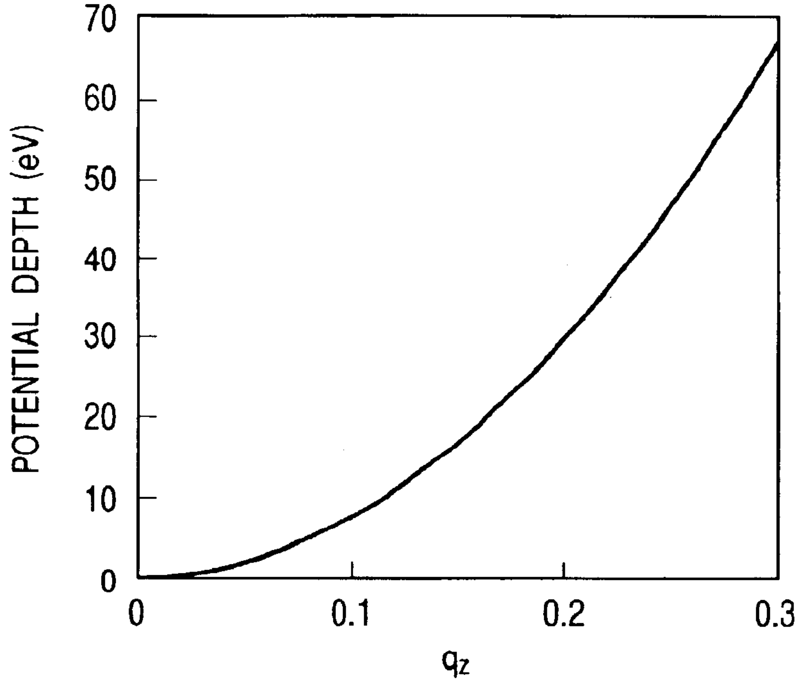
FIG. 6 is a diagram showing the relation between pseudo potential and index deciding ion stability according to a voltage setting method in Embodiment 2.

FIG. 6 is a diagram showing the relation between the pseudo potential and the index deciding ion stability according to the voltage setting method in Embodiment 2. FIG. 6 shows the depth of the potential Dz when the mass is 1000 amu, the frequency of the RF voltage V applied to the ring electrode 9 is 770 kHz, and the distance between the endcap electrodes is 14 mm. To detect fragment ions having a low mass, the qz must be smaller. The potential depth is in proportion to the square of the qz. When the qz is smaller, collisional activated dissociation cannot be conducted. It has been difficult to obtain ions having a low mass as fragment ions in the quadruple ion trap mass spectrometer.

Ion resonant frequency f is given by Formula (9). β(qz) is a stabilizing parameter uniquely given by the qz.

$$f = \frac{\Omega}{4\pi}\beta(q_z) \tag{9}$$

Figure 7:
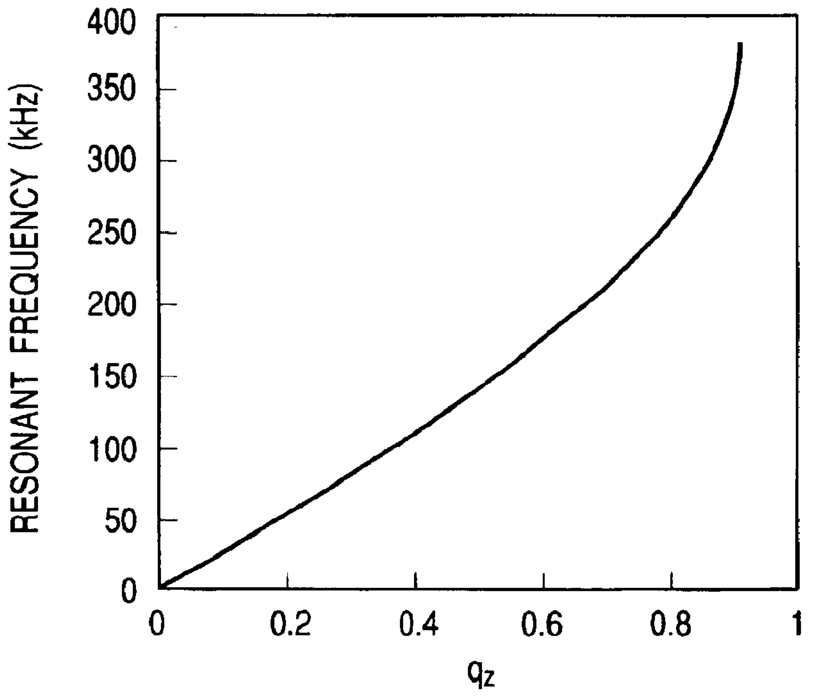
FIG. 7 is a diagram showing the relation between resonant frequency and index deciding ion stability according to the voltage setting method in Embodiment 2.

FIG. 7 is a diagram showing the relation between the resonant frequency and the index deciding ion stability according to the voltage setting method in Embodiment 2. FIG. 7 shows resonant frequency when the frequency of the RF voltage V applied to the ring electrode 9 is 770 kHz. The supplemental AC voltage having the resonant frequency or a frequency near the resonant frequency is applied between the endcap electrodes 7a, 7b.

A single frequency may be used as the frequency of the supplemental AC voltage. A plurality of frequencies may be superimposed on each other.

Described above is the voltage setting method.

An increase ΔEint of internal energy obtained by collision of the ions having the mass m with the intermittently-introduced bath gas having molecular weight M is given by Formula (10).

$$\Delta E_{int} \approx \frac{4}{\pi^2}\frac{M}{m+M}D_z \tag{10}$$

At the same potential, it is found from Formula (10) that the larger the molecular weight of the bath gas, the ion internal energy is largely excited.

Figure 8:
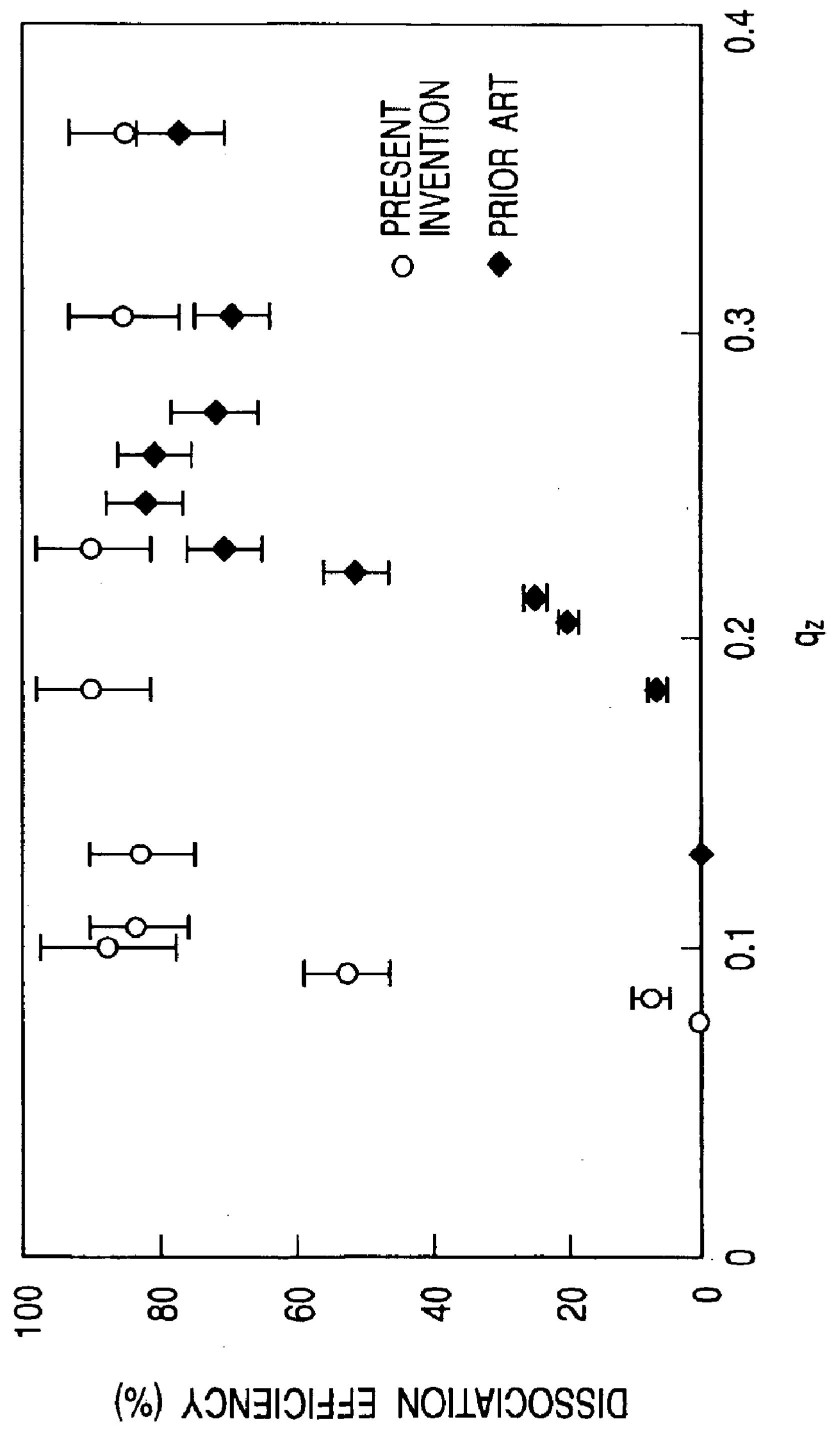
FIG. 8 is a diagram showing dissociation efficiency of leucine-enkephalin monovalent ions when a qz value as the index deciding ion stability is actually changed in Embodiment 2 to verify the effect of the present invention.

FIG. 8 is a diagram showing dissociation efficiency of leucine-enkephalin monovalent ions when the qz value as the index deciding ion stability is actually changed in Embodiment 2 to verify the effect of the present invention. In Embodiment 2, when the qz is above 0.1, high dissociation efficiency is maintained. In the prior art ion trap shown in FIG. 2, unless the qz is above 0.2, ions are not dissociated. In Embodiment 2, ion dissociation is advanced at a low qz value. It is found that detection of the ions having a low mass which has not been enabled in the prior art ion trap construction shown in FIG. 2 is enabled.

Figure 9A:
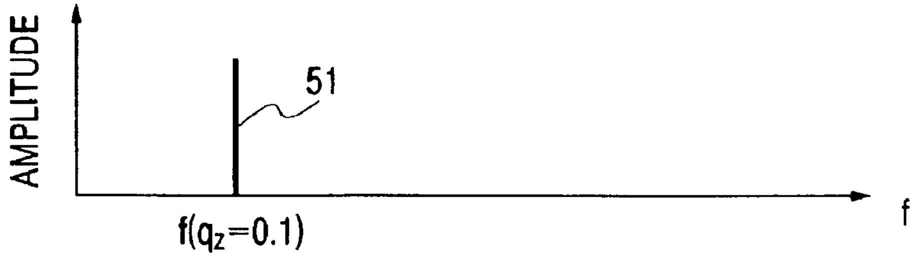
FIG. 9 is a diagram showing an example of the voltage setting method in an ion dissociation process in Embodiment 2 of the present invention and is a diagram showing examples of supplemental AC voltages applied between endcap electrodes 7*a*, 7*b;*
Figure 9B:
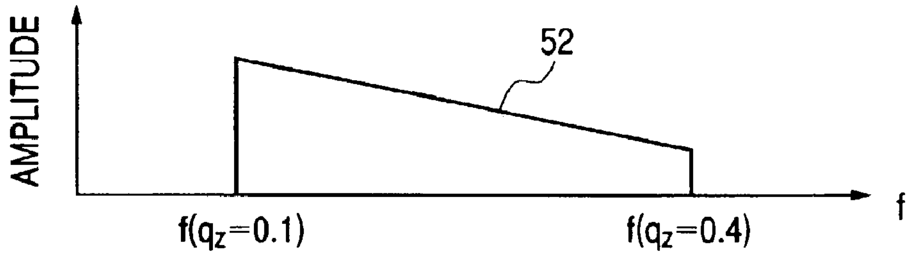
Figure 9C:
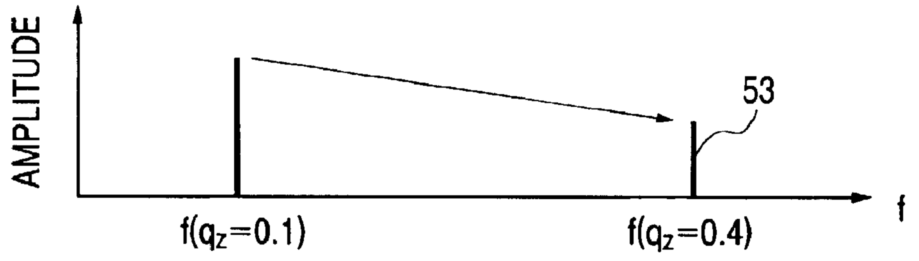

FIG. 9 is a diagram showing an example of the voltage setting method in the ion dissociation process in Embodiment 2 of the present invention and is a diagram showing examples of supplemental AC voltages applied between the endcap electrodes 7*a*, 7*b*. As shown in FIG. 9(A), effective is application of a supplemental AC voltage 51 having a single frequency (f(qz=0.1)) near a frequency resonant with precursor ions as the supplemental AC voltage. As shown in FIG. 9(B), effective is application of a supplemental AC voltage 52 including frequencies of (f(qz=0.1)) to (f(qz=0.4)) as the supplemental AC voltage and having a broad band frequency in which a component having a large frequency has a smaller voltage. As shown in FIG. 9(C)., as the supplemental AC voltage, effective is application of a supplemental AC voltage 53 in which low frequency is changed to high frequency with time. In this case, in the supplemental AC voltage 53, the low frequency f (qz=0.1) is changed to the high frequency f (qz=0.4) with time. The magnitude of the voltage is controlled to be smaller with time.

Application of the supplemental AC voltage 52 having a broad band shown in FIG. 9(B) or application of the supplemental AC voltage 53 in which frequency is changed with time shown in FIG. 9(C) has the merit that once-dissociated ions are additionally dissociated to measure many kinds of fragment peaks as compared with application of the supplemental AC voltage having a single frequency shown in FIG. 9(A).

In the ion detection process, the ions subjected to collisional activated dissociation in the ion trap 500 are ejected to the outside of the ion trap 500 from the hole 50*b* of the endcap electrode 7*b* for each ion mass when the trapping RF voltage and the supplemental AC voltage are changed from low voltage to high voltage. The ions are then detected by the detector 13. The output is sent to the controller 31 to be written as a mass spectrum.

Figure 10:
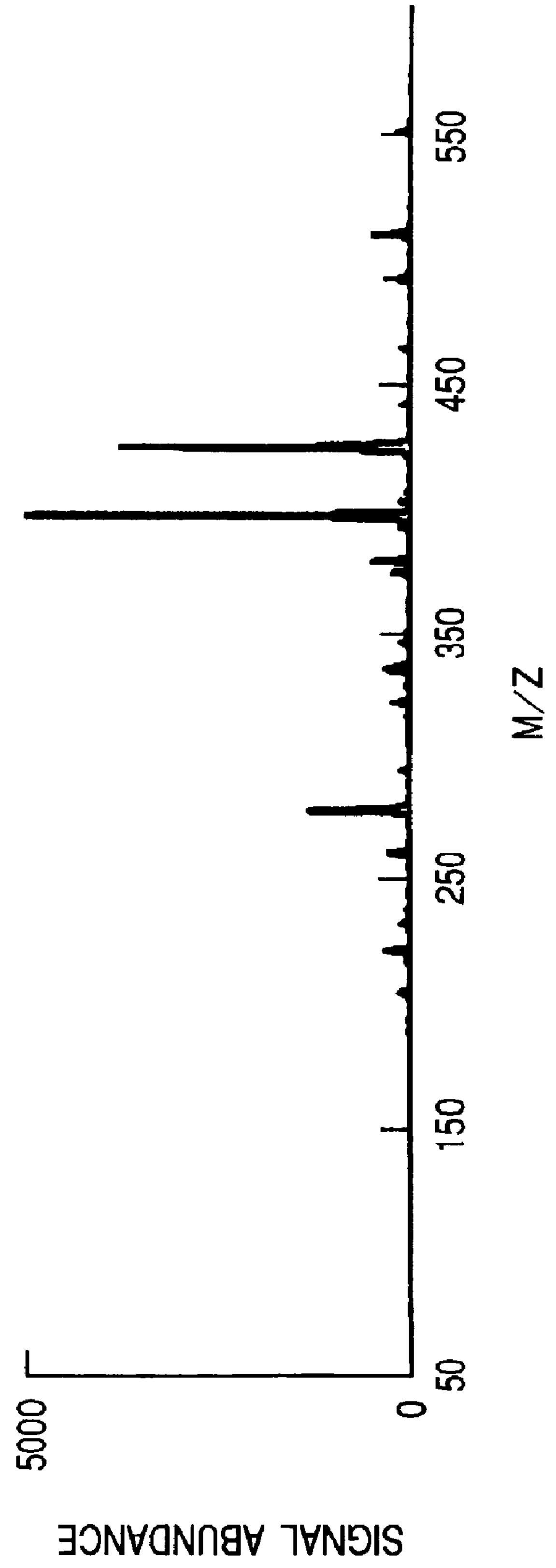
FIG. 10 is a diagram showing a mass spectrum of leucine-enkephalin ions when Ar is introduced in the ion dissociation process to apply a supplemental AC voltage having a single frequency in Embodiment 2 of the present invention.
Figure 11:
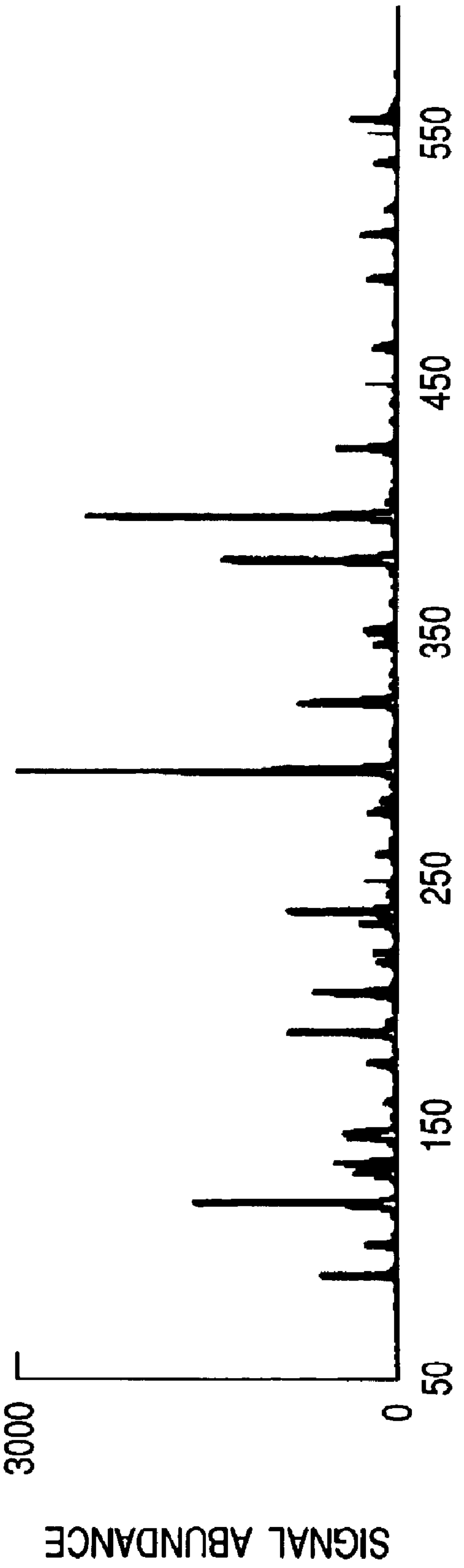
FIG. 11 is a diagram showing a mass spectrum of leucine-enkephalin ions when Ar is introduced in the ion dissociation process to apply a supplemental AC voltage having a broad band frequency in Embodiment 2 of the present invention.

FIGS. 10, 11 are diagrams showing the effect in Embodiment 2 of the present invention. The horizontal axis indicates M/z and the vertical axis indicates relative signal abundance.

FIG. 10 is a diagram showing the mass spectrum of leucine-enkephalin ions when Ar is used as the intermittently-introduced bath gas to be introduced into the ion dissociation process (CID time) and the supplemental AC voltage 51 having a single frequency is applied between the endcap electrodes 7*a*, 7*b* (qz=0.1). In the mass spectrum shown in FIG. 10, many fragment ions having a low mass (m/z<250) are not found. This is because the fragment ions directly generated from precursor ions are ions having a high mass (m/z>250).

As in FIG. 10, FIG. 11 is a diagram showing the mass spectrum of leucine-enkephalin ions when Ar is used as the intermittently-introduced bath gas to be introduced into the ion dissociation process (CID time) and the supplemental AC voltage 52 having a broad band frequency is applied between the endcap electrodes 7*a*, 7*b* (qz=0.1).

As is apparent from comparison with FIG. 10, in the mass spectrum shown in FIG. 11, the ions having a low mass (m/z<250) are also detected. This shows that application of the supplemental AC voltage 52 having a broad band additionally dissociates once-dissociated ions having a high mass (m/z>250) to generate the ions having a low mass. Detecting many kinds of even ions having a low mass is useful to identify the ions. Application of the supplemental AC voltage 52 having a broad band frequency as shown in FIG. 9(B) is found to be effective. Application of the supplemental AC voltage 53 in which frequency is changed with time as shown in FIG. 9(C) can obtain almost the same effect as that of the application of the supplemental AC voltage 52 having a broad band frequency.

Other than the aim to detect the fragment ions having a low mass, for example, when He is used as the intermittently-introduced bath gas, it is effective to dissociate ions which have not been enabled to be dissociated. In this case, the voltage V applied to the ring electrode 9 is set so that the qz at dissociation is about 0.2 to 0.4 as in the general collisional activated dissociation, thereby enabling ion dissociation. The peripheral part of the ion trap 500 is heated to increase the temperature of the intermittently-introduced bath gas. This effect can be further increased.

(Embodiment 3)

Figure 12:
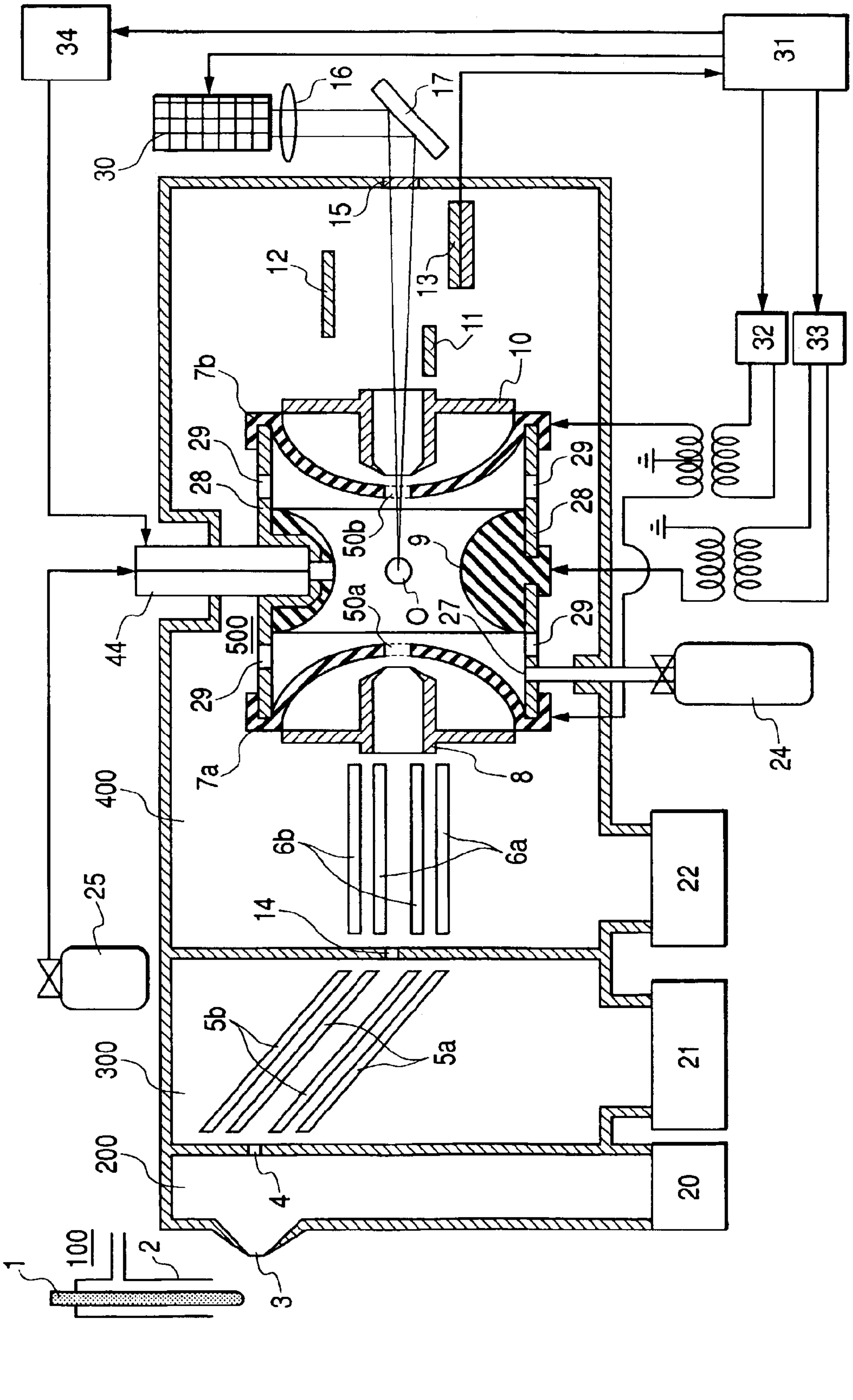
FIG. 12 is Embodiment 3 of the present invention and is a diagram showing a construction example of a mass spectrometer having a construction which applies ion dissociation by laser irradiation to the atmospheric pressure ionization ion trap mass spectrometer explained in Embodiment 2.

FIG. 12 is Embodiment 3 of the present invention and is a diagram showing a construction example of a mass spectrometer having a construction which applies ion dissociation by laser irradiation to the atmospheric pressure ionization ion trap mass spectrometer explained in Embodiment 2. Parts similar to those of FIG. 4 are indicated by the same reference numerals. As is apparent from comparison of both, in the mass spectrometer of Embodiment 3, the process in which ions generated by the ion source 100 are introduced into the ion trap 500 and the process in which fragment ions are detected are the same as those of the mass spectrometer of Embodiment 2. This embodiment is different from Embodiment 2 in that a window 15 is provided in the position opposite the orifice 14 of the third differentially pumping region 400 and a laser beam is incident therefrom. The incident laser beam is irradiated through the hole 50*b* on the endcap electrode 7*b* onto the region O near the center of gravity of the ion trap. The numeral 30 denotes an infrared laser; the numeral 16, an optical lens; and the numeral 17, a mirror. For the lens 16 and the window 15, a material such as ZnSe having high transmissivity of a $CO_2$ laser (wavelength of 10.6 $\mu$m) is used.

In alignment of the laser beam, conducted is rough adjustment of tiling of the mirror 17 so that the beam passes through the holes 50*a*, 50*b* on the endcap electrodes 7*a*, 7*b*. Pseudo samples such as reserpine ions are used to adjust the mirror 17 so that its dissociation efficiency is maximum. Since the mirror 17 is at atmospheric pressure, the operation is easy. To reduce the focused area of the laser beam, larger initial beam expansion is advantageous. It is effective to provide a beam expander, not shown, between the laser 30 and the optical lens 16. This can focus the beam diameter more narrowly.

The laser beam diameter is focused more narrowly to be matched with the area substantially corresponding with the ion expansion in the region O near the center of gravity of the ion trap. It is possible to efficiently give the laser energy to the ions. In FIG. 12, the laser is introduced via the lens and the mirror. There may be a form in which these are omitted to irradiate the beam directly from the laser. In this case, the cost of optical parts can be reduced.

In Embodiment 3, in the ion dissociation process, the cooling gas continuously introduced from the gas introduction aperture 27 into the ion trap 500 in Embodiment 2 is not flowed, or the flow rate of the gas is set to a very low flow rate. The laser beam collides with the cooling gas to relieve ion dissociation. The ion dissociation by laser irradiation is not advanced when the pressure in the ion trap 500 is high (above 0.01 Pa). Due to this, the cooling gas is not flowed, or the flow rate of the gas is set to a very low flow rate. The output of the laser beam irradiated onto the region O of the center of gravity of the ion trap 500 is 10 to 30 W and the focused area is about 0.3 to 2 $mm^2$. The intensity and irradiation timing of the infrared laser 30 are conducted by the controller 31.

Figure 13:
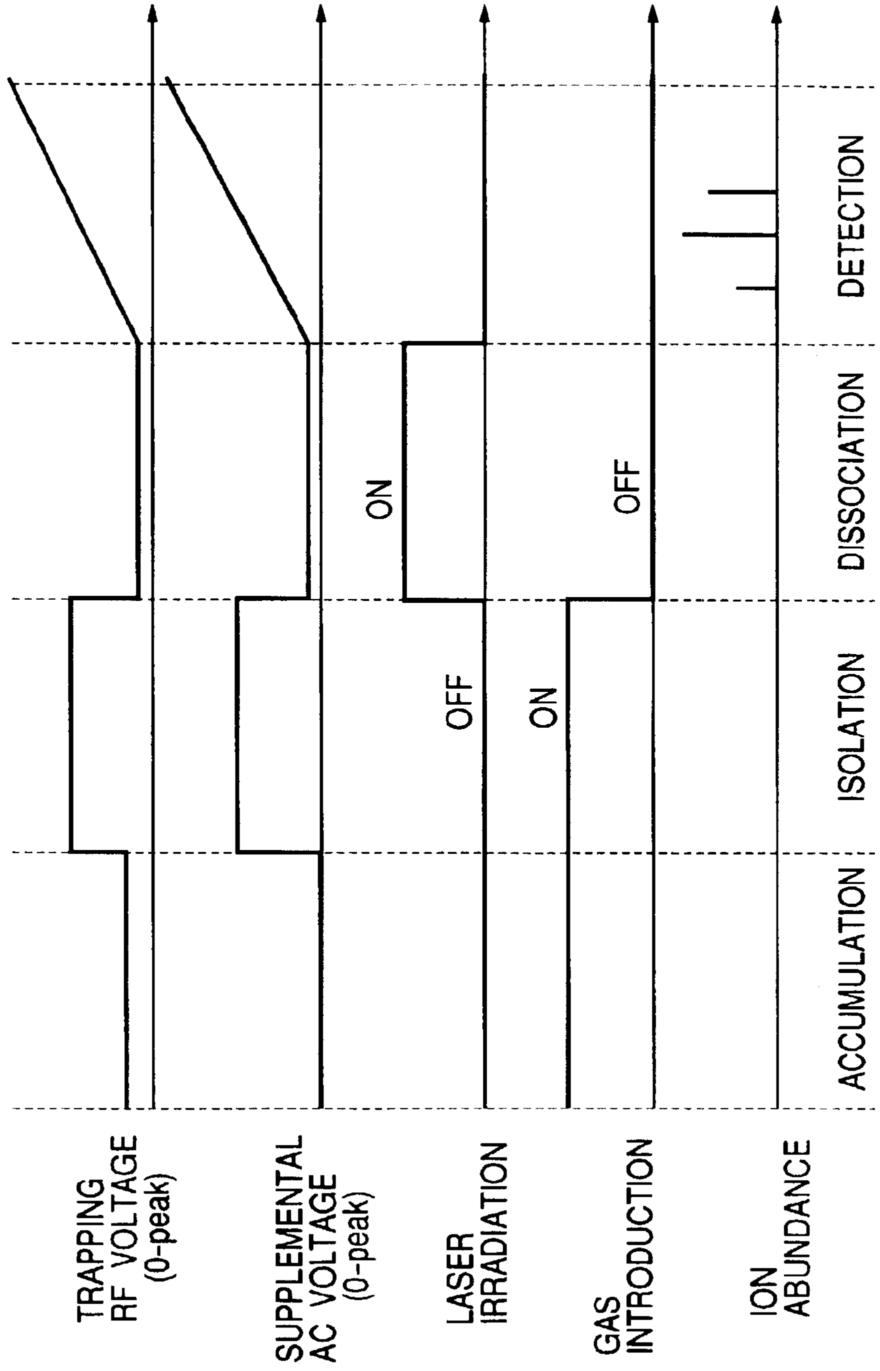
FIG. 13 is a diagram showing measurement sequences of Embodiment 3 of the present invention.

FIG. 13 is a diagram showing measurement sequences of Embodiment 3. The measurement sequences shown in FIG. 13 are controlled by the controller 31. An ion trap operation method of Embodiment 3 will be described below using FIG. 13. In the ion trap operation of Embodiment 3, as in Embodiment 2 (FIG. 5), there are four sequences of the ion accumulation process, the precursor ion isolation process, the ion dissociation process and the ion detection process. The description of the point that the measurement sequences of Embodiment 3 are common to those of Embodiment 2 is omitted, and the different point will be mainly described.

In the ion accumulation process, as in that of Embodiment 2, the trapping RF voltage is applied to the ring electrode to accumulate ions into the ion trap 500. In the ion accumulation process of Embodiment 3, the intermittently-introduced bath gas is introduced from the pulsed valve 44 and application of the supplemental AC voltage and laser irradiation are not conducted. As the intermittently-introduced bath gas, He, Ar and air can be used. The trapping efficiency at ion trapping is higher as the flow rate of the intermittently-introduced bath gas is increased. The intermittently-introduced bath gas enough for trapping is introduced to increase the sensitivity.

In the precursor ion isolation process, as in that of Embodiment 2, only ions in a specific ion mass range remain in the trap. In the precursor ion isolation process of Embodiment 3, the intermittently-introduced bath gas is introduced from the pulsed valve 44 and laser irradiation is not conducted.

In the ion dissociation process, the isolated precursor ions are dissociated. When it is desired that fragment ions having a low mass be detected, the trapping RF voltage is set to low. When it is desired that hard-to-dissociate ions be dissociated, the trapping RF voltage is set to high. In the ion dissociation process, a laser beam is irradiated to apply the supplemental AC voltage of several tens of mV to several V resonant with the precursor ions.

Typical time necessary for ion dissociation is about 5 to 50 ms. The typical output of the laser beam is 10 to 30 W. The laser beam density is 20 to 60 $W/mm^2$ (inaccurate depending on the calculated value). In the ion dissociation process, introduction of the intermittently-introduced bath gas from the pulsed valve 44 is stopped. The pressure in the trap is lowered to below 0.01 Pa in the ion dissociation process.

The ion detection process is the same as that of Embodiment 2.

Figure 14:
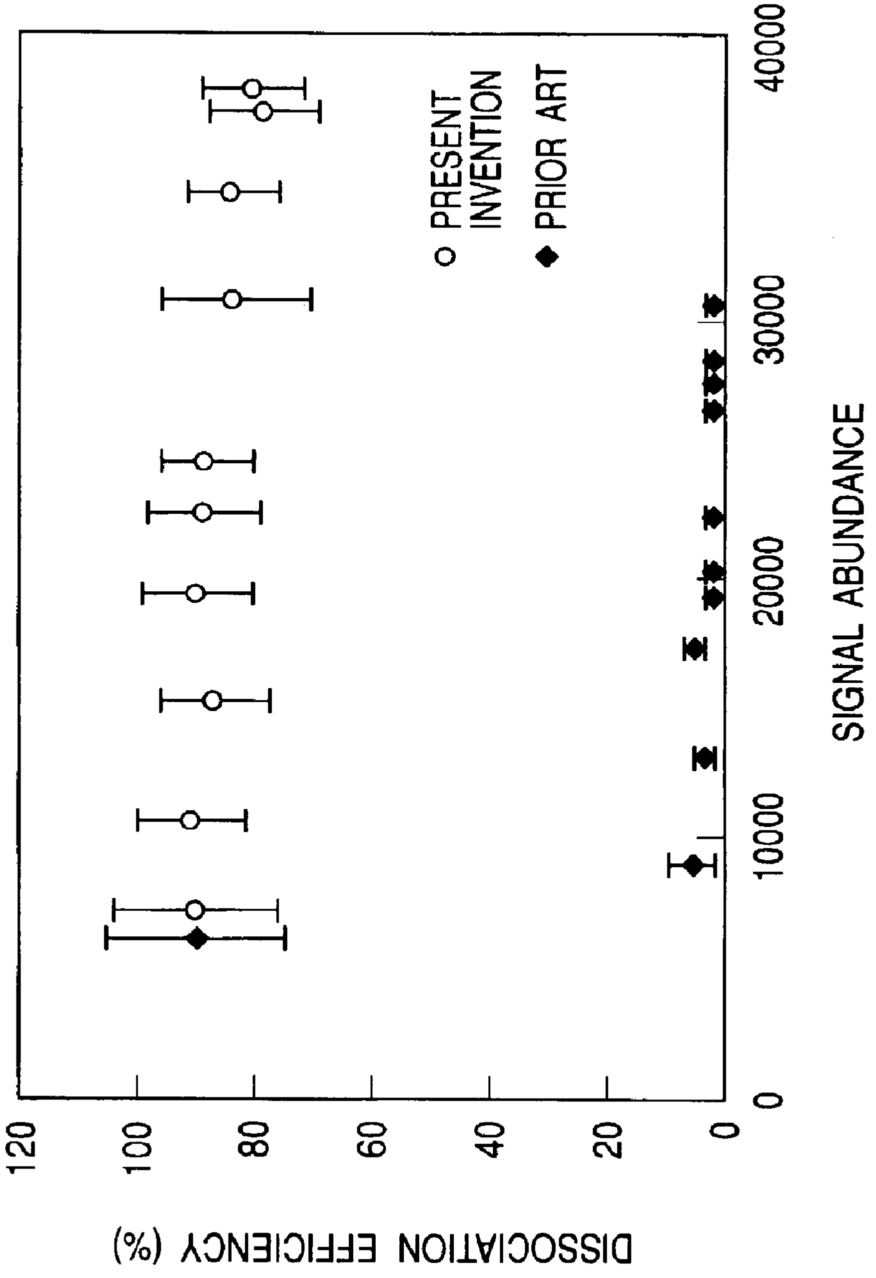
FIG. 14 is a diagram showing results obtained by comparing the case that an intermittently-introduced bath gas for ion dissociation is continuously introduced in the prior art ion trap construction shown in FIG. 2 with the case of Embodiment 3 for ion amount trapped and ion dissociation efficiency by laser irradiation.

FIG. 14 is a diagram showing results obtained by comparing the case that the intermittently-introduced bath gas for ion dissociation is continuously introduced in the prior art ion trap construction shown in FIG. 2 with the case of Embodiment 3 for ion amount to be trapped and ion dissociation efficiency by laser irradiation.

In FIG. 14, the prior art ion trap shown in FIG. 2 advances dissociation at high dissociation efficiency only at a data point corresponding to a signal abundance of about 6000 and a dissociation efficiency of about 90%. This is data when introduction of the intermittently-introduced bath gas is stopped. When the intermittently-introduced bath gas is introduced to increase the trapping efficiency, the signal amount is increased. Dissociation is not advanced (The dissociation efficiency is below about 10%.).

In Embodiment 3', when the intermittently-introduced bath gas is introduced so as to provide trapping efficiency above 6 times that of the prior art shown in FIG. 2, lowered dissociation efficiency is not found. Using Embodiment 3, ion dissociation by laser irradiation which has not been enabled is enabled while maintaining the high trapping efficiency.

(Embodiment 4)

Figure 15:
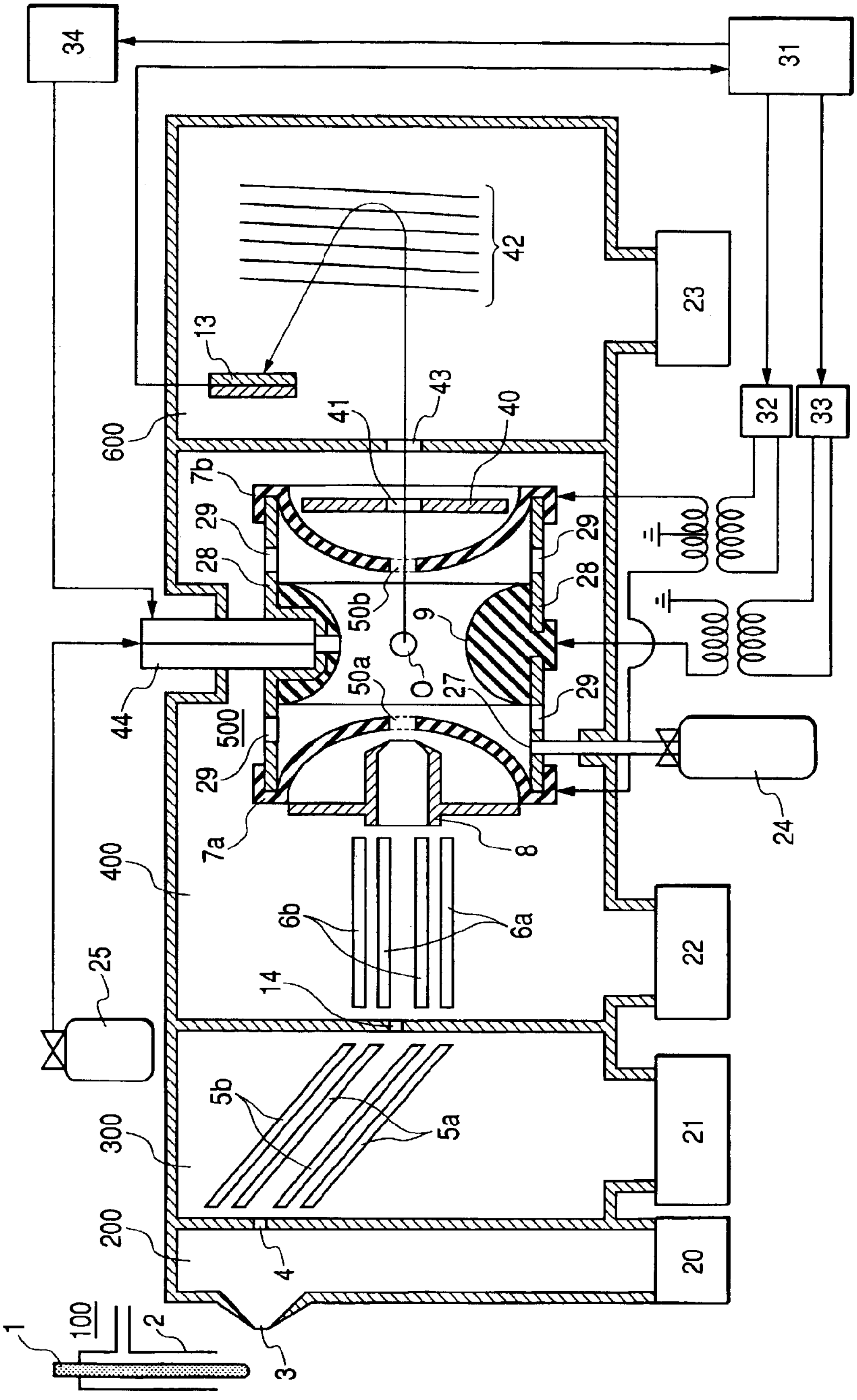
FIG. 15 is Embodiment 4 of the present invention and is a diagram showing a construction example of an atmospheric pressure ionization ion trap-time-of-flight mass spectrometer using the ion trap of Embodiment 1.

FIG. 15 is Embodiment 4 of the present invention and is a diagram showing a construction example of an atmospheric pressure ionization ion trap-time-of-flight mass spectrometer using the ion trap of Embodiment 1. Parts similar to those of FIG. 4 are indicated by the same reference numerals. As is apparent from comparison of both, in the mass spectrometer of Embodiment 4, the process in which ions generated by the ion source 100 are introduced into the ion trap 500 is the same as that of the mass spectrometer of Embodiment 2.

In Embodiment 4, the ion detection method is different from that of the mass spectrometer of Embodiment 2. There is provided a fourth differentially pumping region 600 (time-of-flight mass spectrometric chamber) adjacent the third differentially pumping region 400 to be evacuated from the turbo molecular pump 23 communicated via a hole 43. A reflectron 42 to which a voltage of several kV is applied is provided in the fourth differentially pumping region 600. Ions flied from the ion trap 500 to the reflectron 42 are pushed back in the reverse direction to reach the detector 13 for detection. In other words, the ions are drawn from the quadruple ion trap to be accelerated coaxially with the center axis of the quadruple ion trap for mass dissociation from the flight time of the ions.

The ions dissociated in the ion trap 500 are ejected to the fourth differentially pumping region 600 by applying a DC voltage of several hundreds of V to several kV between the endcap electrodes 7*a*, 7*b* at the initial stage of the ion detection process. A pulse voltage of several hundreds of V to several kV is applied between the endcap electrode 7*b* at the ion outlet side and an accelerator 40 to transfer the ions via a hole 41 of the accelerator 40 to the time-of-flight mass spectrometric chamber 600. A high-speed MCP is used for the detector 13 of the mass spectrometer of Embodiment 4. The construction of Embodiment 4 is advantageous that the mass resolution and mass accuracy of the ions detected are more excellent than those of the construction of Embodiment 2.

In Embodiment 4, as is apparent from the above description, other than the power supplies shown in FIGS. 2 and 3, required are a DC voltage source, a pulse power supply and wiring for connecting these to necessary positions. A general technician can easily prepare these and the illustration is omitted. The controller 31 can easily correspond to it.

Figure 16:
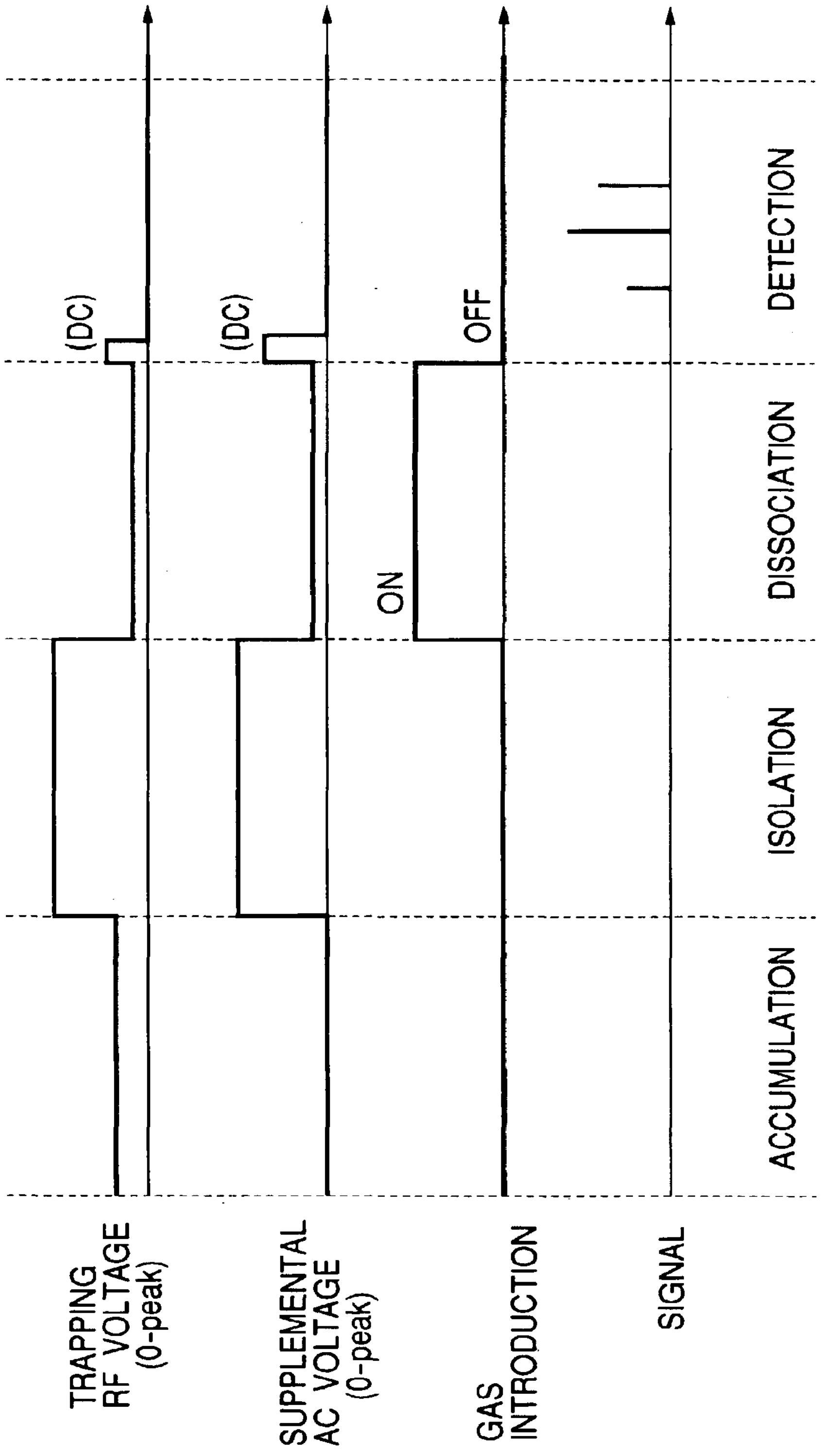
FIG. 16 is a diagram showing measurement sequences of Embodiment 4 of the present invention.

FIG. 16 is a diagram showing measurement sequences of Embodiment 4. The measurement sequences shown in FIG. 16 are controlled by the controller 31. An ion trap operation method of Embodiment 4 will be described below using FIG. 16.

In the ion trap operation of Embodiment 4, as in Embodiment 2 (FIG. 5) and Embodiment 3 (FIG. 13), there are four sequences of the ion accumulation process, the precursor ion isolation process, the ion dissociation process and the ion detection process. The description of the point that the measurement sequences of Embodiment 4 are common to those of Embodiment 2 is omitted, and the different point will be mainly described.

In the ion accumulation process, as in that of Embodiment 2, the trapping RF voltage is applied to the ring electrode to accumulate ions into the ion trap 500. In the ion accumulation process of Embodiment 4, at measurement of positive ions, a voltage of about −100V is applied to the inlet gate electrode 8 and a voltage of about 100V is applied to the accelerator 40. The former is applied to efficiently introduce the ions into the ion trap. The latter is applied not to eject the ions which once enter the ion trap 500. As in the ion accumulation process of Embodiment 2, accumulation is terminated before a phenomenon called space charge occurs.

Of the ions passed through the endcap electrode 7*a* to reach the inside of the ion trap, the stably trapped efficiency depends on the gas pressure by the cooling gas in the ion trap. The gas pressure of 0.06 to 0.4 Pa is a bath gas pressure having good sensitivity and resolution.

The precursor ion isolation process and the ion dissociation process are the same those of Embodiment 2.

In the ion detection process, a DC voltage is applied as shown in FIG. 16. A DC voltage is applied to the endcap electrodes 7*a*, 7*b*, the ring electrode 9 and the accelerator 40. As an example of the voltage, a voltage of 4 kV is applied to the endcap electrode 7*a* at the inlet side, a voltage of 3.5 kV is applied to the endcap electrode 7*b* at the outlet side, and a voltage of about 0V is applied to the accelerator 40. The ions reach the detector 13 after 0 to several tens of microseconds.

(Embodiment 5)

In the above-described embodiments, as shown in FIGS. 5, 13 and 16, there is described the example in which with one pulsed valve 44, the gas pressure of the intermittently-introduced gas introduced from the pulsed valve 44 into the ion trap is changed in pulse form to two ways of ON and OFF.

Figure 17:
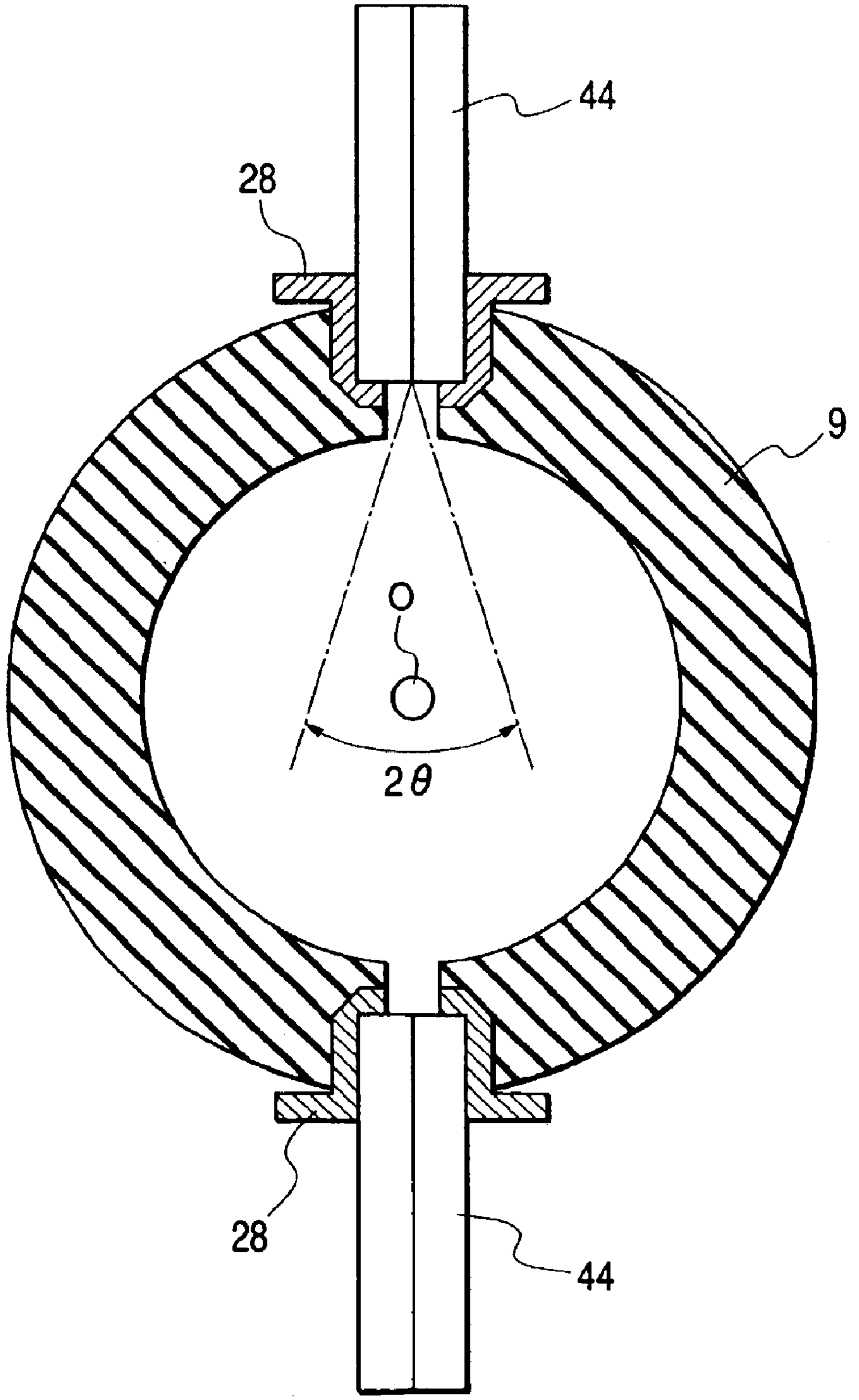
FIG. 17 is Embodiment 5 of the present invention and is a cross-sectional view showing a construction example in which a plurality of pulsed valves 44 are arranged in a ring electrode 9.

FIG. 17 is Embodiment 5 of the present invention and is a cross-sectional view showing a construction example in which a plurality of the pulsed valves 44 are arranged in the ring electrode 9. As shown in FIG. 17, when the plurality of pulsed valves 44 are arranged in the ring electrode 9, gas jetting for allowing ions to cause a chemical action can be given. At this time, as in Embodiment 2, the respective pulsed valves 44 are arranged in part of the ring electrode 9 in the region O in which the straight line almost vertical to the axis connecting the centers of the holes 50*a*, 50*b* on the endcap electrodes 7*a*, 7*b* passing through the center of gravity of the ion trap corresponds with the center axis of the gas flow path of the respective pulsed valves 44. In the example shown in FIG. 17, the two pulsed valves 44 are arranged in the ring electrode 9 so as to be opposite to each other.

(Embodiment 6)

Figure 18:
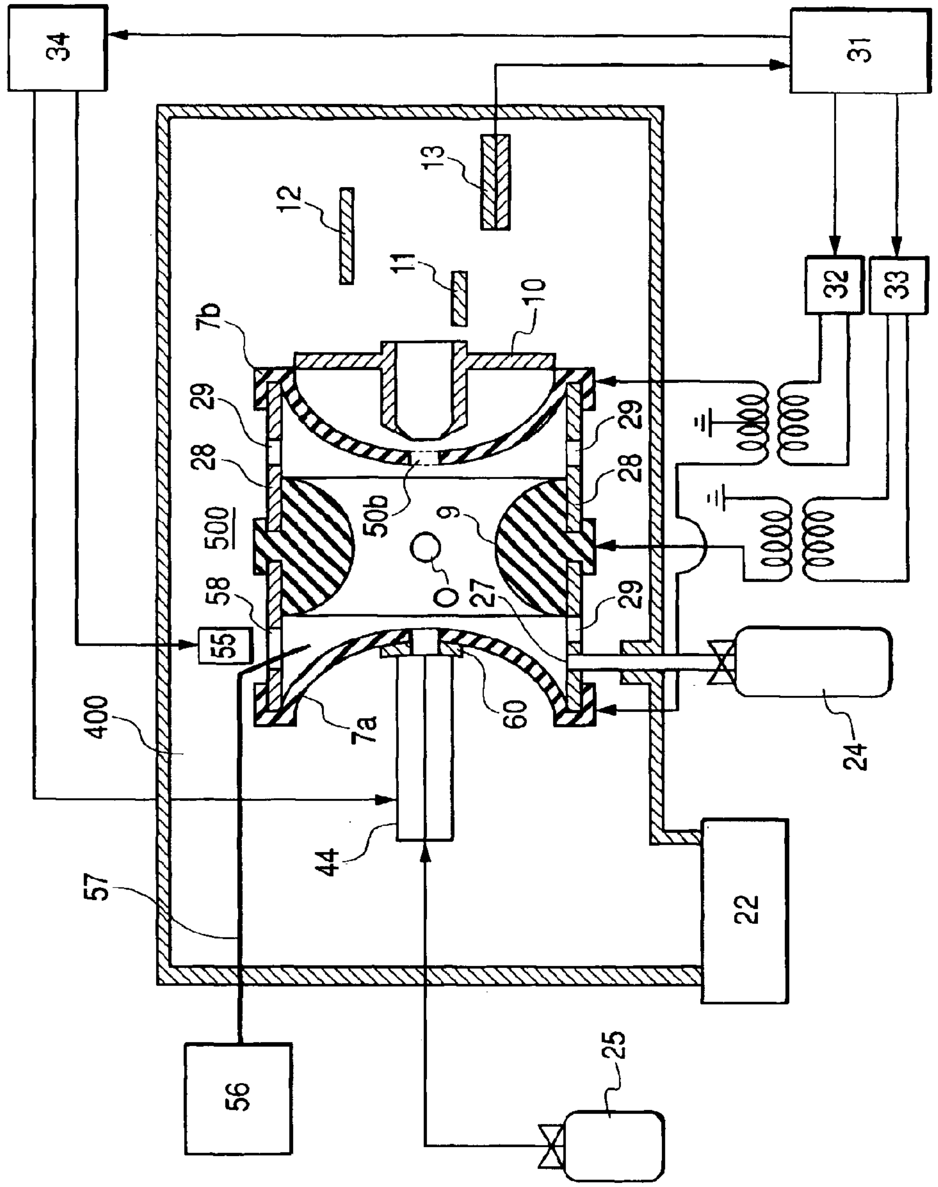
FIG. 18 is Embodiment 6 of the present invention and is a cross-sectional view showing a construction example of the mass spectrometer in which the pulsed valve 44 is arranged in the endcap electrode 7*a.*

In all the above-mentioned embodiments, the pulsed valve 44 is arranged in the ring electrode 9. In the present invention, it may be provided in the endcap electrode 7*a*. FIG. 18 is a diagram showing an embodiment made into such form.

In FIG. 18, the ion trap 500 is provided in the third differentially pumping region 400 shown in Embodiment 2 and the pulsed valve 44 is provided in the endcap electrode 7*a*. The hole 50*b* on the endcap electrode 7*b* is necessary for ion drawing and is the same as that of Embodiment 2. The numeral 60 denotes an insulator between the endcap electrode 7*a* and the pulsed valve 44. The hole 50*a* on the endcap electrode 7*a* is closed by the hole of the pulsed valve 44. The ion source is directly provided in the ion trap 500. As the ion source settable in the ion trap, there are electron impact (EI) and matrix-assisted laser desorption ionization (MALDI). FIG. 18 shows the case of the EI. Samples pass from a sample 56 through a capillary tube 57 to be introduced from a hole 58 provided in the insulator 28 into the ion trap. Sample ionization is conducted by colliding electrons emitted from a filament 55 with a sample gas emitted from the capillary tube 57. Other components similar to those of the construction of Embodiment 2 (FIG. 4) are indicated by the same reference numerals.

The measurement sequence is the same as that of FIG. 5 showing the sequence of Embodiment 2. The filament 55 is controlled by the controller 31. An electric current is flowed only at ion accumulation to eject thermions.

In Embodiment 6, the ion source is arranged in the ion trap and the pulsed valve 44 is provided in the endcap electrode 7*a*. The irradiated area of the intermittently-introduced bath gas supplied from the pulsed valve 44 corresponds with the region O near the center of gravity of the ion trap 500 trapping ions.

The ions can be dissociated efficiently.

(Other Embodiments)

The above embodiments are described by taking, as an example, the case that the electrospray ion source is used as the ion source. The present invention can obtain the same effect for ions generated by matrix-assisted laser desorption ionization, atmospheric pressure chemical ionization, and supersonic-speed spray ionization.

The present invention can provide the mass spectrometer which in the quadruple ion trap, can detect the fragment ions having a low mass without lowering the sensitivity and resolution and dissociate the hard-to-dissociate ions. As compared with the prior art, it is possible to provide the mass spectrometer which can increase qualitative and quantitative ability.

According to the present invention, in the mass spectrometer and the mass spectrometric method using the ion trap, the fragment ions having a low mass can be detected and high-sensitivity measurement is enabled.

What is claimed is:

1. A mass spectrometer comprising:

an ion source generating sample ions;

an ion trap having a pair of endcap electrodes and a ring electrode and accumulating said ions generated by said ion source and isolating precursor ions from the accumulated ions and dissociating the isolated precursor ions and ejecting the dissociated ions from said ion trap;

a gas introduction hole arranged in said ring electrode or said endcap electrode for introducing an intermittently-introduced bath gas into said ion trap; and a detector detecting the ions ejected from said ion trap;

wherein the center axis of said gas introduction hole is arranged so as to pass through the center of said ion trap.

2. The mass spectrometer according to claim 1, wherein said gas introduction hole is arranged in said ring electrode.

3. The mass spectrometer according to claim 1, wherein said gas introduction hole is arranged in at least one of said endcap electrodes.

4. The mass spectrometer according to claim 1, wherein said intermittently-introduced bath gas is introduced into said ion trap via a pulsed valve using a solenoid.

5. The mass spectrometer according to claim 1, further comprising a unit for controlling an application timing of an RF voltage applied to said ring electrode and an introduction timing of said intermittently-introduced bath gas into said ion trap through said gas introduction hole.

6. The mass spectrometer according to claim 1, wherein the distance from the front edge of said gas introduction hole to the center of said ion trap is below 16 mm.

7. A mass spectrometric method comprising the steps of:

generating sample ions by an ion source;

allowing said ions to be incident and accumulated into an ion trap having a pair of endcap electrodes and a ring electrode;

selectively holding precursor ions having a desired mass in said ion trap;

dissociating said precursor ions, wherein an intermittently-introduced bath gas is introduced through a gas introduction hole arranged in said ring electrode having a center axis arranged so as to pass through the center of said ion trap into said ion trap to dissociate said precursor ions;

ejecting the dissociated ions from said ion trap; and detecting the ejected ions.

8. The mass spectrometric method according to claim 7, further comprising a step of controlling an application timing of an RF voltage applied to said ring electrode and an introduction timing of said intermittently-introduced bath gas into said ion trap through said gas introduction hole.

9. A mass spectrometric method comprising the steps of:

generating sample ions by an ion source;

allowing said ions to be incident and accumulated into an ion trap having a first endcap electrode having an incidence hole into which said ions are incident, a second endcap electrode having an ejection hole from which said ions are ejected, and a ring electrode;

selectively holding precursor ions having a desired mass in said ion trap;

dissociating said precursor ions, wherein an intermittently-introduced bath gas is introduced through a gas introduction hole arranged in said ring electrode having a center axis passing through the center of said ion trap to be almost orthogonal to an axis connecting the center axis of said incidence hole and the center axis of said ejection hole into said ion trap to dissociate said precursor ions;

ejecting the dissociated ions from said ion trap; and detecting the ejected ions.

10. A mass spectrometric method comprising the steps of:

generating sample ions by an ion source;

allowing said ions to be incident and accumulated into an ion trap having a first endcap electrode having an incidence hole into which said ions are incident, a second endcap electrode having an ejection hole from which said ions are ejected, and a ring electrode;

selectively holding precursor ions having a desired mass in said ion trap;

dissociating said precursor ions, wherein an intermittently-introduced bath gas is introduced through a gas introduction hole arranged in said ring electrode having a center axis almost orthogonal to an axis connecting the center axis of said incidence hole and the center axis of said ejection hole so as to reach the center part of said ion trap for dissociating said precursor ions;

ejecting the dissociated ions from said ion trap; and detecting the ejected ions.

11. A mass spectrometric method comprising the steps of:

generating sample ions by an ion source;

allowing said ions to be incident and accumulated into an ion trap having a first endcap electrode having an incidence hole into which said ions are incident, a second endcap electrode having an election hole from which said ions are ejected, and a ring electrode;

selectively holding precursor ions having a desired mass in said ion trap;

dissociating said precursor ions, wherein an intermittently-introduced bath gas is introduced th a gas introduction hole arranged in said ring electrode having a center axis arranged so as to pass through a region including the center of said ion trap into said ion trap to dissociate said precursor ions;

ejecting the dissociated ions from said ion trap; and detecting the ejected ions.

12. The mass spectrometer according to claim 1, wherein said intermittently-introduced bath gas is introduced from said gas introduction hole into said ion trap one of (a) during the accumulating of ions generated by said ion source and the isolating of precursor ions from the accumulated ions, and (b) during the dissociating of the isolated precursor ions.

13. The mass spectrometer according to claim 12, wherein said intermittently-introduced bath gas is introduced (a) during the accumulating of ions generated by said ion source and the isolating of precursor ions from the accumulated ions without being introduced (b) during the dissociating of the isolated precursor ions.

14. The mass spectrometer according to claim 12, wherein said intermittently-introduced bath gas is introduced (b) during the dissociating of the isolated precursor ions without being introduced (a) during the accumulating of ions generated by said ion source and the isolating of precursor ions from the accumulated ions.

15. A mass spectrometer method comprising the steps of:

generating sample ions by an ion source;

accumulating ions generated by said ion source in an ion trap having a pair of endcap electrodes and a ring electrode;

isolating precursor ions having a desired mass from the accumulated ions in said ion trap;

dissociating the precursor ions;

ejecting the dissociated ions from said ion trap; and detecting the ejected ions;

wherein, in the step of accumulating the ions and in the step of isolating the precursor ions, an intermittently-introduced bath gas is introduced through a gas introduction hole arranged in said ring-electrode having a center axis arranged so as to pass through the center of said ion trap into said ion trap; and wherein, in the step of dissociating of the precursor ions, a laser beam irradiates the isolated precursor ions in the region near the center of the ion trap.

* * * * *